US009875481B2

(12) United States Patent
Pradhan et al.

(10) Patent No.: US 9,875,481 B2
(45) Date of Patent: Jan. 23, 2018

(54) CAPTURE OF RETAIL STORE DATA AND AGGREGATED METRICS

(71) Applicant: Verizon Patent and Licensing Inc., Arlington, VA (US)

(72) Inventors: Jeetendra Pradhan, Hackettstown, NJ (US); Alexander Lawrence Lamb, Waxhaw, NC (US); Gleice Beloff, Montrose, NY (US); Nirmala Amanthi Chandraratna, San Clemente, CA (US); Shankar Anantrao Kulkarni, Bridgewater, NJ (US); Ashima Hosalkar, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/564,476

(22) Filed: Dec. 9, 2014

(65) Prior Publication Data

US 2016/0162910 A1 Jun. 9, 2016

(51) Int. Cl.
*G06Q 30/02* (2012.01)
*G06Q 10/06* (2012.01)

(52) U.S. Cl.
CPC . *G06Q 30/0201* (2013.01); *G06Q 10/063118* (2013.01)

(58) Field of Classification Search
CPC ...... H04N 7/183; H04N 21/4223; H04N 7/18; H04N 7/147; H04N 7/181; H04N 7/185; H04N 7/188; G06K 9/00778; G06Q 30/02; G06Q 10/107; G06Q 10/10; G06Q 30/0251; G06Q 30/0185; G06Q 30/0241; G06Q 30/0259; G06Q 30/0261; G07C 11/00; G08B 13/19697; G06F 3/0483; G06F 3/04883; G06F 17/211; G06F 17/241; H04L 51/04; H04L 51/08; H04M 1/72552

See application file for complete search history.

(56) References Cited

U.S. PATENT DOCUMENTS

| 6,751,736 | B1 * | 6/2004 | Bowman | G06F 21/606 713/176 |
| 7,415,510 | B1 * | 8/2008 | Kramerich | G06Q 30/02 705/13 |
| 7,483,842 | B1 * | 1/2009 | Fung | G06Q 10/06311 705/7.14 |
| 2008/0119235 | A1 * | 5/2008 | Nielsen | G06F 3/0483 455/566 |

(Continued)

*Primary Examiner* — Thien T Mai

(57) ABSTRACT

A computer extracts traffic data from one or more traffic servers and stores the traffic data in a database. The computer also extracts and stores customer wait time, resource management, and point of sale (POS) data from one or more retail store servers in the database, and each of the retail store servers can correspond to a retail store. Extract and store subroutines may be executed in parallel using multi-threading. Upon achieving synchronization of the parallel subroutines, the computer transforms the traffic, customer wait time, resource management, and POS data from the database by determining one or more metrics for each of the retail stores. Next, the computer loads the one or more determined metrics into the database. Finally, the computer aggregates the one or more determined metrics on at least one of a district level, region level, area level, and nation level to determine one or more aggregated metrics.

20 Claims, 15 Drawing Sheets

(56) References Cited

U.S. PATENT DOCUMENTS

| | | | | |
|---|---|---|---|---|
| 2008/0294487 A1* | 11/2008 | Nasser | ................... | G06Q 30/02 |
| | | | | 705/7.32 |
| 2009/0138342 A1* | 5/2009 | Otto | ....................... | G06Q 30/02 |
| | | | | 706/45 |
| 2010/0013931 A1* | 1/2010 | Golan | ................ | G06K 9/00771 |
| | | | | 348/150 |
| 2012/0092492 A1* | 4/2012 | Carbonell | .............. | G06Q 30/02 |
| | | | | 348/143 |
| 2012/0190388 A1* | 7/2012 | Castleman | .............. | H04L 51/04 |
| | | | | 455/466 |
| 2013/0315404 A1* | 11/2013 | Goldfeder | .............. | H04R 3/005 |
| | | | | 381/58 |
| 2014/0079282 A1* | 3/2014 | Marcheselli | ....... | G06K 9/00335 |
| | | | | 382/103 |
| 2015/0012385 A1* | 1/2015 | Bahnsen | ................ | G06Q 30/06 |
| | | | | 705/26.61 |
| 2016/0104122 A1* | 4/2016 | Mande | .............. | G06Q 10/1095 |
| | | | | 705/7.19 |
| 2016/0300162 A1* | 10/2016 | McManus | .............. | G06Q 10/02 |

\* cited by examiner

CAPTURE OF RETAIL STORE DATA AND AGGREGATED METRICS

BACKGROUND

There is no tool today that has "managing in the moment" capabilities. For example, retail stores have no visibility of how many resources are needed to manage sales transactions, customers, etc. in real time. Due, in part, to the disparate types of information and massive amounts of data that exist across the various retail stores of an enterprise, the prior solutions fail to provide a clear picture of the performance of each retail store and various zones of retail stores, as changes occur on an hour-by-hour or minute-by-minute basis, for example.

The previous solutions also fail to provide insight into the current state of the retail store in real time to facilitate preemptive action against resource shortcomings and to take proactive steps towards optimizing the retail processes. For example, allowing enterprise management personnel to view an upwards spike in customer wait time would allow the enterprise to immediately place additional staff in the retail store to enhance customer satisfaction. Consequently, there are many drawbacks to existing technologies.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference now is made in detail to the examples illustrated in the accompanying drawings and discussed below.

Figure 1:
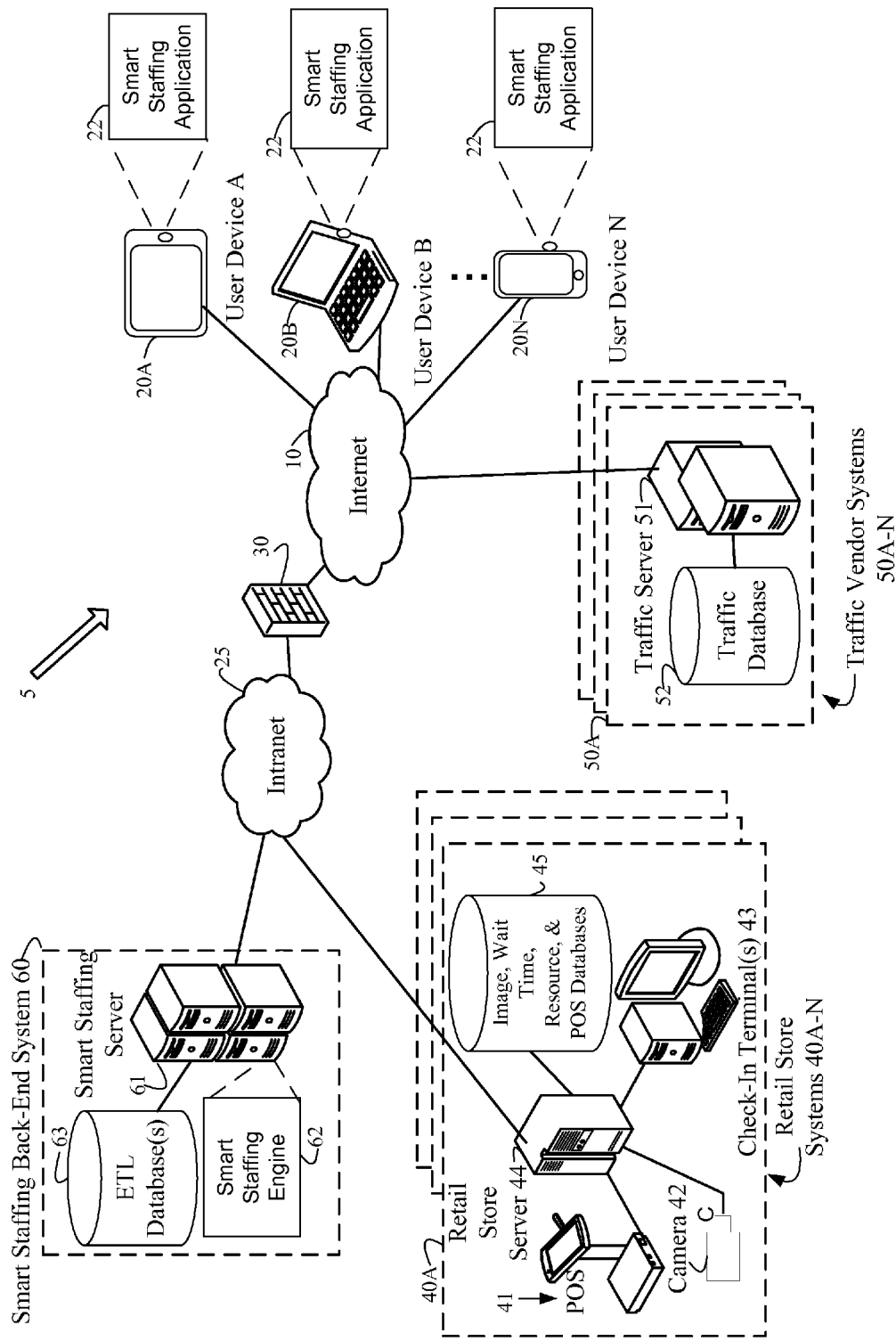
FIG. 1 is a high-level functional block diagram of an example of a system of networks and devices that provide a variety of communication services, including communications in support of capturing retail store data and determining aggregated retail store metrics.

FIG. 1 illustrates a functional block diagram of a system 5 that provides communications in support of capturing retail store data and determining aggregated retail store metrics. The illustrated system 5 includes an Internet communication network 10, in this case, operated in accordance with public packet-switched data transport and Internet Protocol (IP). In another example, the communication network 10 may be a 4G LTE mobile network that provides mobile telephone communications as well as Internet data communication services. In such an environment, communication network 10 may connect to public packet-switched data communication networks such as the Internet via a packet gateway (PGW) (not shown).

Data communications via the Internet communication network 10 with network connected equipment provided for users that utilize respective user devices 20A-N and the other shown devices/systems 40A-N, 50A-N, 60, such as enterprise management personnel, may support a variety of services such as communications of text and multimedia messages, e-mail, web browsing, streaming or downloading content, etc. In our discussion, the user devices 20A-N and other devices/systems 40A-N, 50A-N, 60 use packet communications via the Internet 10 (, Intranet 25, which typically would utilize packet transport and Internet Protocol (IP), including for data, voice and related communications. The devices, here, however, can utilize other networks, other forms of network transport, and/or other protocols for the relevant communications.

As shown, system 5 includes one or more user devices 20A-N (representative of any number of user computing devices), each of which may include a Smart Staffing Application 22 that runs as an application in a web browser, for example. The system 5 provides retailers full visibility of what is happening at retail stores at any moment of the day, enabling preemptive action in order to improve possible sales results and customer experience.

User devices 20A-N can be personal computers (PCs), laptops, personal digital assistants (PDAs), smartphones, tablet computers, portable games or media players with wireless communication elements, or other portable devices designed to communicate via one or more wireless networks, including packet-switched transport networks. User devices 20A-N, however, are in communication with Internet 10 and have the capability to communicate via other wired or wireless media, such as a WiFi connection (now shown). User devices 20A-N and other devices/systems shown 40A-N, 50-A-N, 60 have network communication capability and one or more physical elements for providing a user interface. Internally, such devices/systems typically include one or more wireless transceivers or other network interface device for data communication, a processor configured/connected to control device operation, a memory and programming. As discussed more later, these devices/systems are programmed or otherwise configured to perform various functions involved in the capture of retail store data, determine aggregated metrics, and provide a graphical user interface (GUI) that displays the determined aggregated metrics.

The system administrator that operates the Smart Staffing Back-End System 60 and Retail Store Systems 40A-N also utilize a variety of other systems for related purposes, such as network maintenance and security. In the example, the system administrator has another data network, e.g. Intranet 25, that provides data communications for other data systems used; and that Intranet 25 has connectivity into the Internet 10 that provides communications services to the Traffic Vendor Systems 50A-N to collect camera image data from the Retail Store Systems 40A-N. The camera image data may include a plurality of video frames that, when assembled sequentially, form the video footage captured by the camera. The Intranet 25 is connected to the Internet 10 via routing and protective gear generally represented by the firewall 30.

For purposes of the present discussion, equipment communicating via the Intranet network 25 includes a Smart Staffing Back-End System 60 and a plurality of Retail Store Systems 40A-N (representative of any number of Retail Store Systems).

There may be one or more computer platforms to perform the functions of the Smart Staffing Back-End System 60, which can provide redundancy and enable handling of a particular expected peak volume of switching transactions. As shown, the Smart Staffing Back-End System 60 includes a Smart Staffing Server 61 and extract, transform, and load (ETL) Databases 63, which may be an object-relational database management system or other suitable type of database management system.

Smart Staffing Server 61 is a computer and includes a Smart Staffing Engine 62. The Smart Staffing Engine 62 captures real time traffic data from the Retail Store Systems 40A-N and resource management data, such as staff (i.e., employee or specialist) data. The traffic data indicates a number of customers that are in each of a plurality of retail stores at a given time, for example. The Smart Staffing Engine 62 engine also captures sales transaction data from Retail Store Systems 40A-N, foot traffic data from traffic vendors 50A-N, count of real time resources (e.g., employees) working in the retail store, resource (e.g., employee) schedules, and wait times of each of the stores via Retail Store Systems 40A-N to determine metrics for effective resource management.

Based on the captured data, the Smart Staffing Engine 62 determines metrics at the retail store level to provide performance and productivity indicators for effective resource management of each of the retail stores. Smart Staffing Engine 62 also aggregates the computed metrics of the retail stores in order to determine metrics at the district, region, area, and national levels to provide cross-comparisons at each of these levels. A district includes a plurality of stores, a region includes a plurality of districts, an area includes a plurality of regions, and the national level includes a plurality of areas. The metrics can be used to aggregate stores using geographic and/or logical groupings. Such groupings may include stores bounded by zip code or an arbitrary line drawn on a graphical user interface (GUI) displayed in Smart Staffing Application 22, stores operated by a specific vendor, or stores operated by a specified set of managers. The selected groupings may be predetermined or transmitted from the Smart Staffing Application 22 to the Smart Staffing Engine 62 over the Internet 10. In one example, the stores grouped in a district belong to a particular zip code or several zip codes that are predetermined. In another example, the stores may be selected by a user, such as by drawing or encircling stores on a map that is outputted on the GUI of Smart Staffing Application 22. As yet another example, stores may be selected by a user, such as by selecting a specific vendor that manages specific stores or selecting a set of managers that are responsible for particular stores via the GUI of Smart Staffing Application 22.

The captured data may be refreshed by the Smart Staffing Engine 62 at or after a predetermined time interval, such as every 15 minutes during business hours of a respective retail store. In another example, the default setting of the predetermined time interval can be automatically adjusted depending on the conditions of the store. For example, when there is a new product launched within a product launch time period (e.g., less than 2 days), the number of new products exceed a number of new products threshold (e.g., 2 new products) within the product launch time period, and/or the store traffic is exceeds a threshold number of customers (e.g., 50 customers), then the predetermined time interval may be adjusted downwards, such as to 5 minutes. On the other hand, when there have been no new products launched within a product launch time period (e.g., 2 days), the number of new products is below a number of new products threshold (e.g., 2 new products), and/or the store traffic is below a threshold number of customers (e.g., 50 customers), then the predetermined time interval may be adjusted upwards, such as to 30 minutes. Hence, the metrics generated by Smart Staffing Engine 62 can be repeatedly determined at or after the predetermined time interval to provide real time insight into the state of a retail store. In addition, the aggregated metrics can be determined again at or after the predetermined time interval to provide aggregated metrics at the store, district, regional, area, and national levels for comparison purposes. The generated metrics at each time interval may subsequently be retrieved by the Smart Staffing Application 22 of the user devices 20A-N by an Extensible Markup Language (XML) request and displayed as a graph in a GUI.

Due to the collected retail store data from each of the retail stores and determined metrics, the Smart Staffing Engine 62 may generate daily and monthly historical views of the data metrics that can be displayed within the Smart Staffing Application 22. Using such historic data and the determined metrics (both for the retail store and aggregated), the Smart Staffing Engine 62 forecasts each of the metrics, such as foot traffic, on a given day or month for a retail store or at any of the various aggregate levels. Such forecasts project the future metric behavior of the metrics for the retail store, district, region, area, and nation based on the captured retail store data and determined metrics. Hence, Smart Staffing Engine 62 increases system-wide accountability for proper resource management across a wide variety of situations. The term "resource" is the number of staff, number of POS Terminals) 41, and number of Check-In Terminals) 43 that can be drawn on by an enterprise or organization to enable the retail store(s) to function effectively. The determined metrics can be used to adjust resources in the store based on the situation, for example, how busy the store is on a Wednesday afternoon versus a Friday evening; or during a day or weekend of a new product launch versus when there have been no new products launched within the past week.

Retail Store Systems 40A-N typically include a point of sale/service (POS) Terminal 41, Camera 42, Check-In Terminal(s) 43, Retail Store Server 44, and an Image, Wait Time, Resource, and POS Databases 45. Such equipment may be connected by a local area network, although when the Retail Store Server 44 resides off-site from the retail store, a wide area network, such as the Internet 10 may also provide connectivity. The Retail Store Server 44 typically retrieves, processes, and stores data collected from the POS Terminal 41, Camera 42, and Check-In Terminal(s) 43 in the Image, Wait Time, Resource, and POS Databases 45. The Check-In Terminal(s) 43 may be a computing device located within the retail store and controlled by the enterprise that executes an application to allow each customer to log his/her arrival by entering a unique identifier (e.g., name, mobile device number, etc.), and thus enter a queue to receive staff support with products or services available in the retail store. Alternatively, the Check-In Terminal(s) 43 may be a computing device, such as a mobile device, owned by the customer that runs an application (e.g., a web browser executing a web page) to allow the customer to enter a queue to receive staff support with products or services.

Typically, a retail merchant operates a store, bank branch office, restaurant or similar brick-and-mortar type of business at a premises. Although different types of businesses use different equipment for payment processing, the retail store has a POS Terminal system 41. Larger enterprises may have multiple POS terminals at a particular premises and may have any number of similar premises. The POS Terminal system 41 typically receives information to determine an amount of payment required for a purchase and interacts with the customer in some manner to obtain and account for the payment for the particular purchase. Of note, the POS Terminal 41 may be a mobile device that is carried by a staff member (i.e., employee) of the retail store to log when each customer is initially provided service for purposes of wait time calculations.

The merchant also operates a backend system of one or more computers, generally represented by the Retail Store Server 44, for its data collection processing purposes. The Retail Store Server 44 communicates with the POS Terminal 41, for example, to note items/services purchased (e.g. for inventory management purposes), amounts charged or received in payment for accounting purposes, volume of sales transactions, time of sales transaction, etc. Although shown at one premises or facility for convenience, the Retail Store Server 43 may be at another location separate from the retail store, bank branch, restaurant or the like having the POS Terminal 41. Hence, it should be understood that the Retail Store Server 44 and Image, Wait Time, Resource and POS Databases 45 may reside physically within the retail store or completely outside the retail store (off-site). The salient point is that the Retail Store Server 44 collects data for the particular retail store(s), and thus Retail Store Server 44 may be located either on-site or off-site. Both the POS Terminal 41 and the merchant's Retail Store Server 44 may communicate via a secure private network or a virtual private network through the Internet 10, e.g. so that the POS Terminal 41 can implement credit, debit or other payment transaction processing, and so that the accounting application in the Retail Store Server 44 can track payments to the enterprise via financial institutions.

Retail Store Systems 40A-N also have a Camera 42 for monitoring and imaging foot traffic, for example, the number of customers or visitors at the enterprise at a given time. In the example, the Camera 42 is a digital camera. Although the drawing shows a single Camera 42, for convenience, it should be appreciated that the Retail Store Systems 40A-N may have two or more Cameras 42 to identify the zone of the retail store that a customer has entered and the zone where the customer has exited. Also, Retail Store Systems 40A-N may have multiple cameras to support three-dimensional (3D) imaging applications. In one example, each of the Retail Store Systems 40A-N include a closed-circuit television (CCTV) system to record and store the captured images of the digital video. The captured images of the digital video may be stored in a network video recorder (NVR) or digital video recorder (DVR) and then transmitted to the Retail Store Server 44. When the Camera 42 is an internet protocol (IP) camera (a type of digital camera), for example, the image data may be sent directly to Retail Store Server 44. Such an IP camera uses a local area network (LAN) of the Retail Store System 40A-N to transmit the images in digital form to the Retail Store Server 44. When Retail Store Server 44 resides off-site, the captured images are transmitted through the LAN of Retail Store System 40A-N prior to being transmitted across the wide area network to the off-site Retail Store Server 44.

The Camera 42 has data communication capabilities and is connected to the Retail Store Server 44. The imaging data generated by the Camera 42 is sent to the Retail Store Server 44 for processing. Typically, the imaging data from the Camera 42 is used to capture the number of customers walking in and out of the retail store. In response to receiving the imaging data from the Retail Store Server 44, the Traffic Vendor Systems 50A-N process the image data using an automated image processing routine and generate actual traffic data from the raw camera image data.

For example, the Traffic Vendor Systems 50A-N execute a motion detection routine to recognize when a customer enters or exists each retail store, such as video content analysis (VCA), based on the received images, and/or may use a facial recognition routine to uniquely identify each customer and track the progress of each identified customer until each identified customer exits the store. Such a VCA algorithm detects and determines temporal events that are based on multiple images captured from the Camera 42 over time. Hence, the Traffic Vendor Systems 50A-N recognize changes by identifying and comparing objects in the retail store using size, speed, and color to track individuals by calculating their position across multiple captured images (e.g., video frames). In addition, when multiple Camera(s) 42 are employed within each of Retail Store Systems 40A-N, the Traffic Vendor Systems 50A-N can track customer progress through the entire retail store. To preserve individual anonymity, the actual identity (e.g., name, driver's license number, etc.) of the individual customer may not be used. Hence, the individual is tracked through the retail store by using a randomly generated identifier or tag that can be linked to the size, speed, and color of the individual in the images, but not the individual's actual identity.

As shown, Retail Store Systems 40A-N also include one or more Check-In Terminals 43 that engage in communications with the Retail Store Server 44. As noted, above the Check-In Terminal 43 may be a computing device, such as a PC, which runs an application to log the entry of a customer in the retail store and track the wait time of the respective customer at the store. The time between when the customer checks in via a Check-In Terminal 43 and is serviced by a customer service representative at a POS Terminal 41 is the wait time. Upon being serviced, the customer is deemed to be no longer waiting and the time differential between when the customer checked in via the Check-In Terminal 43 and was serviced via the POS Terminal 41 is logged by the Retail Store Server 44 and stored in the Image, Wait Time, Resource and POS Databases 45. As noted above, the POS Terminal 41 may be a mobile device that is carried by an employee of the retail store to log when each customer is initially provided service for purposes of wait time calculations.

Typically, the customer is tracked within the Retail Store Systems 40A-N, such as POS Terminal 41, Camera 42, and Check-In Terminal 43 by a mobile directory number (MDN), although another suitable customer identifier may be used. For example, the customer may be tracked by any phone number or other identifier that is used to uniquely identify the customer in a loyalty or rewards-based program. The Check-In Terminal 43 also tracks when employees of the retail store clock in and out work in order to track the number of employees on duty. Although only one Check-In Terminal 43 is shown, it should be appreciated that any number of devices may service as a Check-In Terminal 43, including the customer's and employee's personal mobile devices.

A plurality of Traffic Vendor Systems 50A-N each include a Traffic Server 51 and a Traffic Database 52. In the discussion, each Traffic Server 51 fetches raw image data from the Retail Store Systems 40A-N by engaging in communications with Retail Store Server 43. The Retail Store Server 43 provides the captured camera image data from the Image, Wait Time, Resource, and POS Databases 45. Upon receiving the image data via an application programming interface (API) call to the Retail Store Server 44, the Traffic Server 51 processes the image data and stores the processed data as real-time traffic data for each of the retail stores. Subsequently, in response to receiving a request for the processed traffic data, the Traffic Vendors 50A0N may return the traffic data as a flat file (e.g., comma separated value file), an Extensible Markup Language (XML) response/file, or one or more database records.

Figure 2:
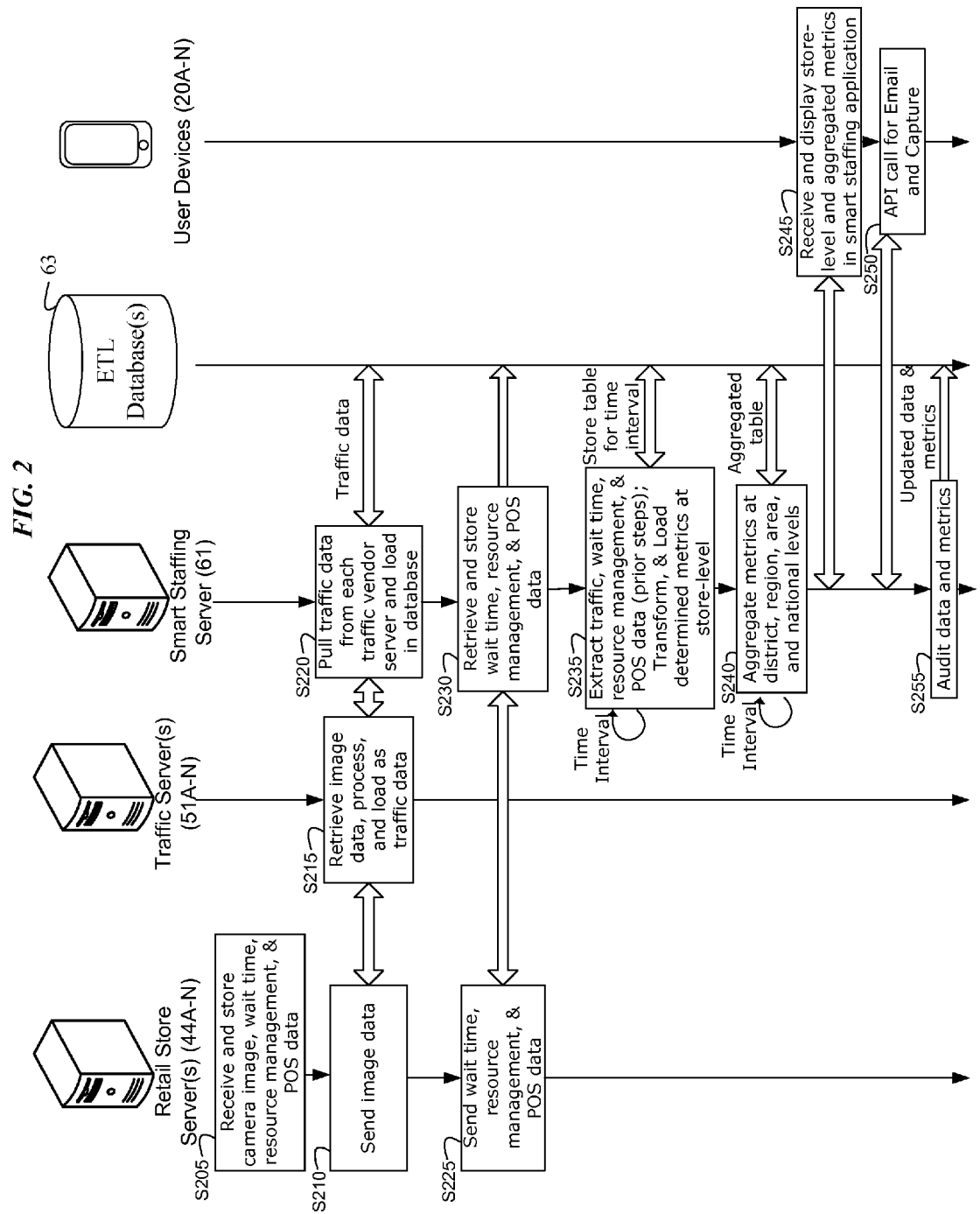
FIG. 2 is a flow chart of a procedure executed on the Smart Staffing Server and other components of the system of FIG. 1 for determining aggregated retail store metrics in real time or near real time.

FIG. 2 illustrates a procedural flow executed on the Smart Staffing Server 61 and other components of the system 5 of FIG. 1. In the illustrated example, servers 44A-N, 51A-N, 61 and devices 20A-N are in communication with the Internet 10. Although shown as occurring serially, the blocks of FIG. 2 may be reordered or parallelized depending on the implementation, as discussed below.

Beginning in step S205, Retail Store Servers 44A-N, receive and store camera image, wait time, resource management, and POS data in the Image, Wait Time, Resource, and POS Databases 45. In the example, the camera image data is collected from each Camera 42 of the Retail Store Systems 40A-N. The wait time data is collected from each Check-In Terminal 43 of the Retail Store Systems 40A-N. Typically, a customer logs in to the Check-In Terminal 43 upon entering a brick-and-mortar retail store that is controlled by each of the Retail Store Systems 40A-N. In one example, the log in information supplied by the customer may include a mobile directory number (MDN), although it should be understood that other identifiers that identify a particular customer may be inputted or generated at the Check-In Terminal 43.

The resource management data is also stored in the Image, Wait Time, Resource, and POS Databases 45 by the Retail Store Servers 44A-N. In an example, each of the Retail Store Servers 44A-N tracks the count of real time employees working in the store in 15 minute intervals, including the times those employees clock in and out of work, using the Check-In Terminal(s) 43. The time interval may be configurable, such that a system administrator may utilize Smart Staffing Application 22 to adjust the time interval, and then transmit the adjusted interval to Smart Staffing Engine 62 to adjust the rate of data collection and metrics determination, for example. The Retail Store Servers 44A-N also track the schedules of each store employee, including expected arrival time and departure time, during the scheduled days of work.

POS data is also captured and stored in the Image, Wait Time, Resource, and POS Databases 45 from each POS Terminal 41 of the Retail Store Systems 40A-N. The POS data includes real time sales transaction data logged by each POS Terminal 41, including number of sales or purchases. Such POS data is later combined with the traffic data to calculate a conversion rate. The conversion rate is the number or percentage of customers who walk in the retail store and complete a sales transaction, in other words, purchase a product or service (i.e., number of sales transactions divided by the foot traffic). The conversion rate can be used to develop strategies (e.g., promotions, offers, etc.) to bring in new customers and train employees to help bring in additional customers. In one example, the conversion rate is used to adjust prices of the products sold in the retail store by having the Retail Server 44 of POS Retail Stores Systems 40A-N adjust, in real time, product prices that are stored in the Image, Wait Time, Resource, & POS Databases 45 and accessed by the POS Terminal 41. For example, when the conversion rate is determined to be below a predetermined conversion rate threshold (e.g., 10%), the Retail Store Server 44 may adjust prices of the products sold in the retail store downwards by a predetermined price adjustment threshold (e.g., 10%). On the other, hand when the conversion rate is determined to be above a multiple of the predetermined conversion rate threshold (e.g., a factor 3), the Retail Store Server 44 may adjust prices of the products sold in the retail store upwards by the predetermined price adjustment threshold.

Continuing now to step S210, each of the Retail Store Servers 43A-N sends camera image data to a respective Traffic Server 51 of the Traffic Vender Systems 50A-N. In the example, each of the Retail Store System 40A-N includes a Camera 42 to capture images of the foot traffic, e.g., the number of customers walking in the retail store. Each of the Retail Store Systems 40A-N are assigned a respective Traffic Vendor System 50A-N based on geographic location of the retail store. In our example, to reduce network latency and alleviate network congestion, the camera image data of each of the Retail Store Systems 40A-N is sent to a Traffic Vendor System 50A-N that is closest in geographic proximity. Alternatively, the Traffic Vendor Systems 50A-N may be selected by dividing the Retail Store Systems 40A-N into areas/quadrants, and assigning a Traffic Vendor System 50A-N to the midwest, northeast, south, and west areas/quadrants of the United States, for example.

Moving now to step S215, upon receiving the image data, each of the Traffic Servers 51A-N stores the image data in a Traffic Database 52, for example. Subsequently, the Traffic Servers 51A-N retrieve the image data, process the image data, and load the processed data as traffic data in the Traffic Database 52. Typically, the processed traffic data includes one or more entries (e.g., in XML format), where each entry can include a location identifier to uniquely designate a particular retail store of a plurality of retail stores, a date, a timestamp (e.g., 12:00 PM) indicating when the image data was received, number of customers entering the particular retail store at the timestamp, and number of customers exiting the particular retail store at the timestamp.

Proceeding now to step S220, the Smart Staffing Server 61 pulls the traffic data from each Traffic Server 51A-N and loads the traffic data in the ETL Databases 63. The traffic data may be fetched using a variety of modes, and the mode depends on the format of the traffic data utilized by the Traffic Server 51A-N. In one example, the traffic data is pulled from the Traffic Servers 51A-N as a flat file, such as a comma separated value file. In another example, the traffic data is pulled from traffic servers 51A-N via an application programming interface (API) call, such as by way of an Extensible Markup Language (XML) request service call, and is returned in an XML file format. In yet another example, the data is pulled from the Traffic Servers 51A-N as one or more Structured Query Language (SQL) database records.

Continuing now to step S225, the Retail Store Servers 44A-N send the wait time, resource management, and POS data to the Smart Staffing Server 61. Such data is collected in step S205 by the Retail Store Servers 44A-N. Typically, the data collection by the Retail Store Servers 44A-N in step S205 occurs at a much higher frequency or rate (i.e., shorter time interval) than the rate at which the collected data is sent to the Traffic Servers 51A-N in step S225.

In step S230, the Smart Staffing Server 61 retrieves and stores the wait time, resource management, and POS data that has been received from the Retail Store Servers 44A-N. Upon receiving such data, the Smart Staffing Server 61 N loads the wait time, resource management, and POS data in ETL Databases 63. To reduce network communication overhead, the wait time, resource management, and POS data is typically retrieved by the Smart Staffing Server 61 at or after predetermined time intervals which exceed the time intervals at which the data is collected within the Retail Store Systems 40A-N.

Continuing now to step S235, the Smart Staffing Server 61 extracts the traffic, wait time, resource management, and POS data; transforms the extracted data by determining one or more metrics for each of the Retail Store Systems 40A-N; and loads the determined metrics into the ETL Databases 63. The extraction sub-step of S235 was partially described in steps S220 and S230 to demonstrate that the extraction of the traffic data from the Traffic Servers 51A-N is separate from the extraction of the wait time, resource management, and POS data from the Retail Store Servers 44A-N. Thus, it should be understood that the extraction sub-step of S235 is not a second extraction of the same data that was previously retrieved in S220 and S230, but rather is intended to indicate that the Smart Staffing Engine 62 may reinitiate the extraction of the traffic, wait time, resource management, and POS data, as shown in steps S220 and S230, each time interval that the extracted data is transformed and then loaded.

The Smart Staffing Server 61 may reduce network latency to speed up the data extraction process, thereby improving the performance of the computer. In one example, steps S220 and S230 may be done in parallel because there is no data dependency among each of the Retail Store Servers 44A-N or Traffic Servers 51A-N. In addition, data extraction from each of the Retail Store Servers 44A-N within step S220 and the data extraction from each of the Traffic Servers 51A-N within step S230 may also be done in parallel with each step. Both types of parallel approaches may exploit parallel multithreading or other asynchronous techniques. A multithreading approach exploits instruction level parallelism to improve computing throughput. When using such parallel approaches, the Smart Staffing Server 61 waits until the data is fully extracted to achieve synchronization before performing transformations to determine metrics for each of the retail stores. As another way to achieve synchronization, a waiting time period may be empirically determined (e.g., 2 minutes) by the Smart Staffing Server 61 based on past computing collection times to extract and store data from each of the Retail Store Servers 44A-N and Traffic Servers 51A-N. For example, the longest historical computing time to extract and store data from any of the Retail Store Servers 44A-N and Traffic Servers 51A-N may be selected as the waiting time period, the median extract and store time may be selected, or an average may be selected. The Smart Staffing Server 61 may then proceed to step S235 when the waiting time period elapses.

In step S235, upon extracting such data, the Smart Staffing Server 61 transforms the extracted data and loads the transformed data into the ETL Databases 63 by determining one or more metrics for each of the retail stores of the retail store systems 40A-N. The extracted data may be transformed to generate two different types of metrics: (1) real time daily metrics that are updated at or after a predetermined time interval; and (2) month to date (MTD) metrics. In addition, the metrics may be determined on a weekly, yearly, or other predetermined time interval that is adjusted by a user, such as by specifying a certain number of week(s), month(s), or year(s). For example, the user may select to generate metrics by customizing the predetermined time interval to every two days, every two weeks, every two months, or every two years. In addition, the time frame (e.g., daily or MTD) over which data is collected and/or displayed at the predetermined time interval may also be adjusted by the user, such that the metrics for the time frame are set to a single week, two weeks, two months, etc. When the user selects a time frame of two years, and a predetermined time interval of every two weeks, the data for that two year period is determined and then aggregated at the two week interval level. Such adjustments may be made using a GUI of Smart Staffing Application 22, which transmits the adjustments to Smart Staffing Engine 62. The determined metrics become accessible to the Smart Staffing Application 22 of user devices 20A-N upon completion of the transform and load sub-steps of S235.

To generate the real time daily metrics, a time interval table is created in the ETL databases 63 and the time interval table includes one or more primary keys that uniquely identify a report. In an example, each row of the time interval table corresponds to a report that includes determined metrics for the retail store at a particular date and time of day. The primary key is an attribute or set of attributes whose values are combined to maintain uniqueness of each row of the time interval table. The primary key(s) may include a report date; a timestamp indicating the current time of day (e.g., 12:00 PM); the time interval (e.g., 15 minutes);

a location identifier (ID) to uniquely identify each retail store; and a level index indicating that the data is at the store level. After being determined, metrics for the retail store at the given time of day are then populated into a particular row of the time interval table and thus are linked to the one or more primary key(s) of the row. The metrics in the time interval table may include: (1) number of sales transactions (i.e., total number of purchases or orders); (2) average customer wait time; (3) maximum customer wait time; (4) number of customers waiting; (5) number of employees on duty; (6) percentage of employees on duty; (7) sales transactions per employee; (8) foot traffic (i.e., number of customers in the retail store); (9) conversion rate; (10) foot traffic per employee; and (11) foot traffic per full-time employee.

The number of sales transactions, average customer wait time, maximum customer wait time, and number of customers waiting are determined from the POS data that was collected from the Retail Store Servers 44A-N. More specifically, the number of sales transactions indicates the number of purchases that have occurred at the retail store and is included directly in the POS data. The average customer wait time is determined by averaging the time between when each of the customers checked in at a Check-In Terminal 43 and subsequently checked out at a POS Terminal 41. As noted above, the POS Terminal 41 may be a mobile device that is carried by an employee of the retail store to log when each customer is initially provided service for purposes of wait time calculations.

Of note, when the average customer wait time exceeds a predetermined time threshold (e.g., seven minutes), the Smart Staffing Application 22 causes the average customer wait time metric of the retail store to turn red upon being displayed. Alternatively, tiered levels of predetermined thresholds may exist depending on the wait time increases. For example, exceeding a first predetermined customer wait time threshold (e.g., seven minutes) may cause the average customer wait time metric of the retail store to turn yellow. Exceeding a second predetermined customer wait time threshold (e.g., ten minutes) may cause the average customer wait time metric of the retail store to turn orange. And exceeding a third predetermined customer wait time threshold (e.g., fifteen minutes) may cause the average customer wait time metric of the retail store to turn red. When the average customer wait time is less than the predetermined time threshold (e.g., seven minutes), the Smart Staffing Application 22 causes the average customer wait time metric of the retail store to turn green upon being displayed The maximum customer wait time is determined by selecting the largest time between when each of the customers checked in at a Check-In Terminal 43 and subsequently checked out at a POS Terminal 41. The number of customers waiting is determined by calculating which customers that checked in at a Check-In Terminal 43 have checked out at a POS Terminal 41.

The number of employees on duty is determined directly from the resource management data by calculating which employees that logged in at a Check-In Terminal 43 have logged out at a Check-In Terminal 43. The percentage of employees on duty is determined by dividing the number of employees on duty by the total head count (i.e., total number of employees of the retail store) and multiplying by one-hundred. Of note, the total head count of each retail store is directly included in the resource management data that was extracted earlier from the Retail Store Servers 44A-N. The sales transactions per employee is determined by dividing the number of sales transactions included in the POS data by the number of employees on duty.

The foot traffic is determined from the traffic data that was collected from the Traffic Vendors 50A-N and may be calculated by subtracting a number of customers exiting the retail store from a number of preexisting customers within the retail store and adding a number of customers entering the retail store. The number of preexisting customers within the retail store is set to the prior foot traffic calculation that occurred during the immediately preceding time interval (i.e., the last time the foot traffic was calculated). However, the number of preexisting customers is set to zero when each retail store initially opens each day to initialize the foot traffic at the beginning of the day. The conversion rate is determined by dividing the total number of sales transactions by the foot traffic. In addition, the conversion may subdivided into different types of conversion rate metrics. In one example, a first conversion rate specifies the number of sales transactions for customers purchasing a particular product (e.g., mobile device). A second conversion rate specifies the number of sales transactions for customers purchasing a particular service (e.g., mobile device data or voice plan). A third conversion rate specifies the number of sales transactions for customers purchasing accessories (e.g., mobile device accessories). In order to determine which of the customers from the total foot traffic came in with the intention of purchasing a particular product, service, or accessories, the POS Terminal 41 is used. As discussed above, the POS Terminal 41 is configured as a mobile device that is carried by an employee of the retail store to log when each customer is initially provided service by the employee; whether products, services, or accessories are sought by the customer; and which products, services, or accessories the customer seeks.

The foot traffic per employee is calculated by dividing the foot traffic by the number of employees on duty. And the foot traffic per full-time employee (FTE) is calculated by dividing the foot traffic by the number of full-time employees of the store. Of note, the number of full-time employees of each retail store is included in the resource management data that was extracted earlier.

Upon generating the foregoing real time daily metrics, the Smart Staffing Server 61 updates the time interval table in the ETL Databases 63 to include the determined metrics. As indicated earlier, each time interval table is linked to a time interval using the one or more primary keys discussed earlier. Hence, step S235 and the prior steps may occur repeatedly at or after this predetermined time interval, and each time staging table(s) are updated (or new table(s) are generated) with the determined metrics for each retail store and loaded in the ETL Databases 63. It should be noted that the metrics determined at or after the time interval for the retail store may only account for the changes from the last time interval (e.g., total number of sales transactions occurring only in the last 15 minutes), or alternatively, may be cumulative metrics for the entire day (e.g., total number of sales transactions for the entire day). When the metrics only account for the changes since the last time interval, the daily metrics may be obtained by combining the metrics in each of the time interval tables of the retail store on a given day as indicated by the location identifier and report date primary keys. The metrics of number of sales transactions and foot traffic are combined by summing. One the other hand, the metrics of average customer wait time, number of customers waiting, number of employees on duty, percentage of employees on duty, sales transactions per employee, conversion rate, foot traffic per employee, and foot traffic per full-time employee are combined by averaging. Finally, a single maximum customer wait time is selected from all of the time interval tables.

To generate the MTD metrics, a monthly table is created in the ETL databases 63 and the MTD table includes one or more primary keys. In an example, each row of the monthly table corresponds to a report that includes determined metrics for the retail store at a particular date. The primary key is an attribute or set of attributes whose values are combined to maintain uniqueness of each row of the monthly table. The primary key(s) may include a report date; a timestamp (e.g., 5:00 PM) indicating the current time of day or daily close of business time; a location identifier (ID) to uniquely identify each retail store; and a level index indicating that the data is at the store level. After being determined, MTD metrics for the retail store on the given day are then populated into a particular row of the monthly table and thus are linked to the one or more primary key(s) of the row. Such MTD metrics are determined by combining (i.e., summing, averaging, or selecting) the already existing retail store level and aggregated data metrics (see step S240) after the auditing that occurs in step S255. Such MTD metrics provide insight at a monthly level as opposed to at a daily view. Moreover, such MTD metrics may be used to forecast the metrics at the store, district, region, area, and national levels for the day and month, as discussed in step S255.

Continuing now to step S240, the determined metrics are aggregated at a variety of levels, including district, region, area, and national levels. Due to lack of data dependencies, the aggregated metrics for each of the districts of a plurality of districts may be determined in parallel using multithreading or other asynchronous manner. Similarly aggregated metrics for each of the regions, areas, and nations may be determined in parallel using multithreading, for example. When using such parallel processing approaches, the Smart Staffing Server 61 waits until the metrics for each of the districts are determined to achieve synchronization before aggregating metrics at the region level. As another way to achieve synchronization, a waiting time period may be empirically determined (e.g., 5 minutes) by the Smart Staffing Server 61 based on past computation times to determine the aggregated district metrics for all districts. The Smart Staffing Server 61 can proceed to determine the aggregated region metrics when the waiting time period elapses. The same synchronization techniques are used for parallel processing of the aggregated metrics for the regions, areas, and nations.

Typically the store level data is aggregated upon completion of step S235 and occurs at or after the same predetermined time interval of step S235. It should be understood that a district includes a plurality of stores, a region includes a plurality of districts, an area includes a plurality of regions, and the national level includes a plurality of areas. During this aggregation step, first the metrics for each of the retail stores that were generated in step S235 are combined and stored in an aggregate district table having the metrics for the corresponding district that those retail stores reside in. The primary key(s) of each district table may include a report date; a timestamp indicating the current time or that reproduces the timestamp from a time interval table of the retail stores; the time interval; a location identifier (ID) of the district; and a level index indicating that the data is at the district level.

Next, the metrics for each of the districts (e.g., Southern California or Northern California) are combined and stored in an aggregate region table having the metrics for the corresponding region (e.g., California) that those districts reside in. The primary key(s) of each region table may include a report date; a timestamp indicating the current time or that reproduces the timestamp from an aggregate district table of the districts; the time interval; a location identifier (ID) of the district; and a level index indicating that the data is at the region level. Subsequently, the metrics for each of the regions (e.g., California and Arizona) are combined and stored in an aggregate area table having the metrics for the corresponding area (e.g., west) that those regions reside in. The primary key(s) of each area table may include a report date; a timestamp indicating the current time or that reproduces the timestamp from an aggregate region table of the regions; the time interval; a location identifier (ID) of the district; and a level index indicating that the data is at the area level. Finally, the metrics for each of the areas (e.g., midwest, northeast, south, and west) are combined and stored in an aggregation table having the metrics for corresponding nation (e.g., United States) that those areas reside in. The primary key(s) of each national table may include a report date; a timestamp indicating the current time or that reproduces the timestamp from an aggregate area table of the areas; the time interval; a location identifier (ID) of the nation; and a level index indicating that the data is at the national level. Each of the generated aggregated metric tables is stored in the ETL Databases 63.

Moving now to step S245, the store-level and aggregated metrics are received by the user devices 20A-N from the Smart Staffing Server 61. Upon receiving the store-level and aggregated metrics, the Smart Staffing Application 22 of the user devices 20A-N displays the data. Typically, the received metrics are displayed via a graphic user interface (GUI) in a dashboard that may include or more graphs or tables to assess performance of at various levels, including the retail store, district, region, area, and nation as well as to gain insight into forecasted performance and past historical performance of each of the levels.

In step S250, the user of the Smart Staffing Application 22 may draw on the screen of the Smart Staffing Application 22 via a mouse on a PC or by gesture writing/editing on a tablet or smartphone. The Smart Staffing Application 22 emails a capture of the screen shot with the drawing markup to a corporate email box, for example. Such functionality allows managers of various retail stores, district, regions, areas, etc. to pinpoint metrics and bring them to attention. To capture the application screen with the drawn annotations/markup, a sequence of application programming interface (API) calls is used, as discussed in further detail in FIG. 4.

In step S255, the Smart Staffing Server 61 audits the aggregated traffic data that was received from the Traffic Servers 51A-N. At the end of each day or other predetermined time intervals, the Traffic Vendor Systems 50A-N correct the traffic data to account for discrepancies that may have occurred during the real-time processing of step S215. Upon extracting such audited data (e.g., once a day), the Smart Staffing Server 61 stores the audited data in the ETL Databases 63. Subsequently, the the Smart Staffing Server 61 determines, once again, the metrics that were previously computed in steps S235 and S240 at both store and aggregate levels. Hence, the store-level metrics are adjusted based on the audited traffic data to created audited store-level metrics, and subsequently the aggregated metrics are determined, once again, based on the audited store-level metrics for each of the retail stores to create audited aggregated metrics.

The audited metrics are subsequently loaded in the ETL Databases 63 in order to provide an accurate representation for historic comparison purposes. In addition, the audited metrics are used to forecast the metrics at the store, district, region, area, and national levels for the day and month by, for example, allowing the Smart Staffing Application 22 to retrieve and display the audited metrics side-by-side with actual real time metrics for a given day or month. Providing such audited metrics can advantageously provide insight into future behavior at the retail store, district, region, area, and national levels and maximize future performance, such as by allowing the organization to adjust resources allocated based on historic behavior.

Figure 3:
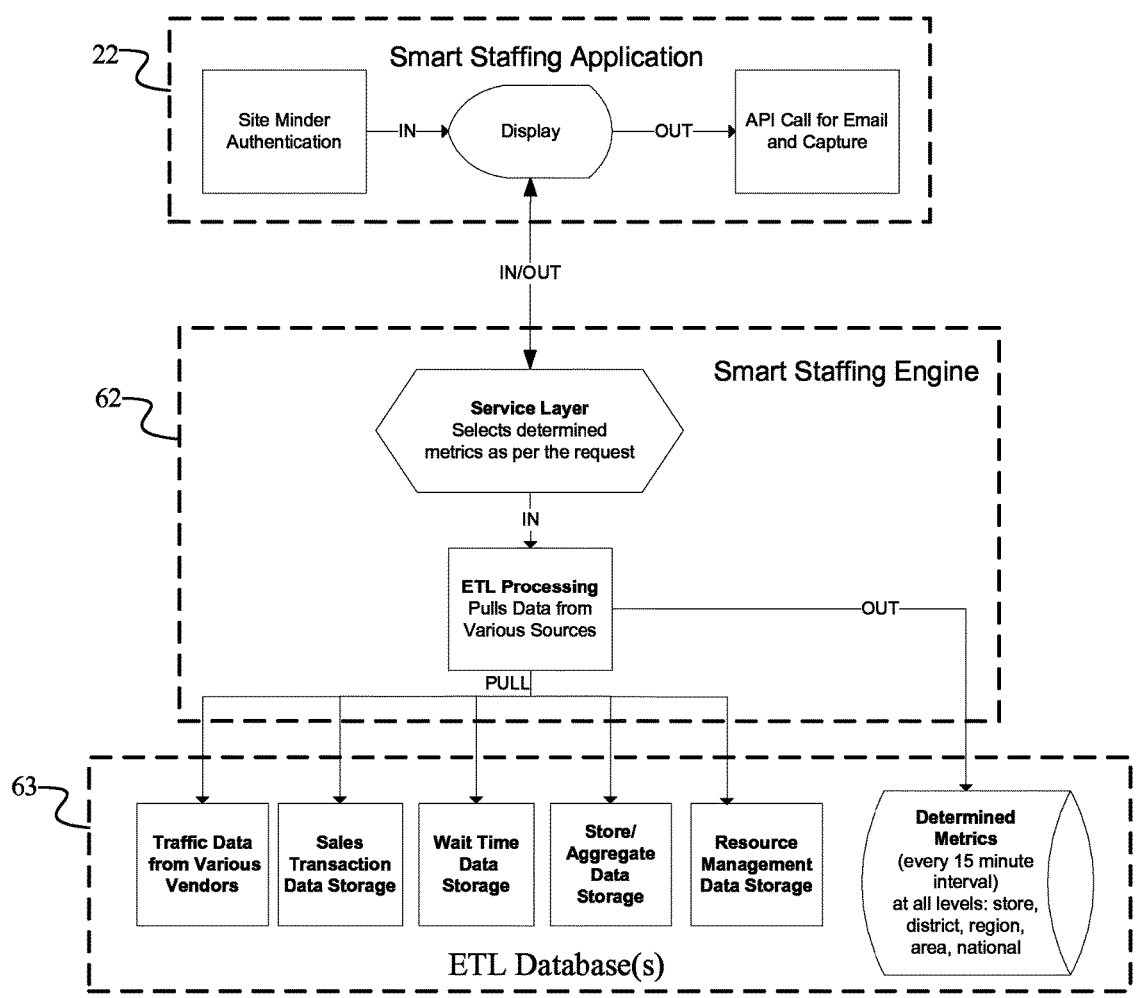
FIG. 3 is a flow chart of a procedure of the extract, transform, and load process that is executed on the Smart Staffing Server and other components of the system of FIG. 1.

FIG. 3 illustrates a high-level block diagram of the ETL process that is executed on the Smart Staffing Server 61 and other components of the system 5 of FIG. 1. As shown, traffic data from various Traffic Vendor Systems 50A-N may be pulled and then stored in the ETL Databases 63 of the Smart Staffing Back-End System 60. Typically, the traffic data is extracted by the Smart Staffing Engine 62 from the Traffic Vendor Systems 50A-N at or after a predetermined time interval. In the example, that time interval is 15 minutes. The depicted sales transaction data, wait time data, and resource management data is extracted by the Smart Staffing Engine 62 from the Retail Store Systems 40A-N at or after a predetermined time interval, which is also 15 minutes in the example. The sales transaction storage is the POS data, including number of sales transactions. The wait time data includes the POS data and data from Check-In Terminal(s) 43. The resource management data includes number of employees of each store and number of full-time employees of each store. The store/aggregate data includes previously determined metrics for a store, district, region, area, and nation from audited data (see step S255 of FIG. 2) and is pulled from a master copy for historical comparison purposes. The historical metrics may be set to a default time period of two years, for example, or be an adjustable setting. In an example, Smart Staffing Application 22 includes a GUI that allows a user, such as a system administrator, to adjust the historical time period to a specified number of day(s), week(s), month(s), or year(s). The adjustable time period is then transmitted to the Smart Staffing Engine 62 via the Internet.

The Smart Staffing Engine 62 processes (i.e., transforms) the extracted data by determining one or more metrics, as discussed previously. In our example, the metrics are determined every 15 minutes and then loaded in a database table in an Oracle SQL database back-end. The determined metrics may include one or more metrics (e.g., performance indicators) for various retail stores, districts, regions, areas, and nations to allow comparisons to be made across retail stores, districts, regions, areas, nations, etc.

Subsequently, the service layer of the Smart Staffing Engine 62 makes the determined data metrics available to the Smart Staffing Application 22 of the user devices 22A-N. In the example, the Smart Staffing Application 22 uses an authentication method/tool, such as Site Minder Authentication, to enable user authorization to access the determined metrics. Upon being authorized, the Smart Staffing Application 22 displays the metrics on a GUI. As further shown, the display of the Smart Staffing Application 22 may subsequently be drawn on by the user using a mouse or a gesture editing/writing. A screen capture of the drawing layer on top of the web page of the smart application 22 may then be captured and emailed, as described in detail in FIG. 4 below.

Figure 4:
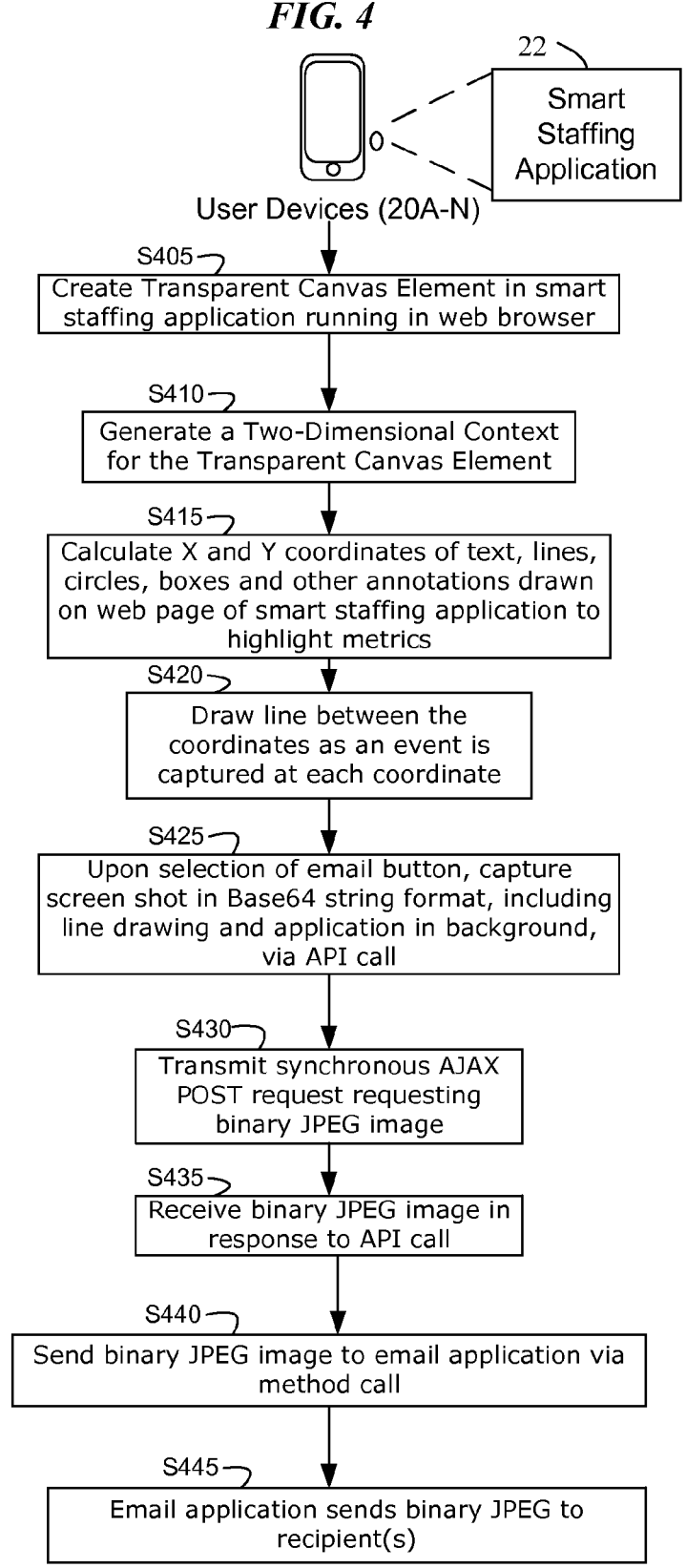
FIG. 4 is a flow chart of a procedure to capture and email a screenshot of the Smart Staffing Application, where the procedure is executed on the user devices and other components of the system of FIG. 1.

FIG. 4 illustrates a procedural flow to capture and email a screenshot of the Smart Staffing Application, which is executed on the user devices 20A-N and other components of the system 5 of FIG. 1. In the illustrated example, the Smart Staffing Application 22 initiates the procedural flow beginning in step S405. As shown, a transparent canvas element is created dynamically and placed on top of the screen of the Smart Staffing Application 22. The transparent canvas is an element introduced in Hypertext Markup Language (HTML) version number 5.

Proceeding now to step S410, a 2-dimensional context object is created for the transparent canvas element. The 2-dimensional context object can be created by invoking the HTML method getContext ("2d") object in order to draw text, lines, boxes, circles, and other annotations on the canvas element.

Continuing now to step S415, the X and Y coordinates of the 2-dimensional context object are calculated. When the user devices 20A-N include PC devices, the X and Y coordinates of the drawn text, lines, boxes, etc. are calculated with the "mousedown," "mousemove," and "mouseup" HTML events. Alternatively, when the user devices 20A-N include tablet or smartphone computing devices, the X and Y coordinates of the drawn text, lines, circles, boxes, etc. are calculated with the "touchstart," "touchmove," and "touchend" HTML events.

Moving now to step S420, a line is drawn between the coordinates upon capturing an event at each coordinate. When the user devices 20A-N include PC devices, the line is drawn between the coordinates as the "mousemove" HTML events is captured at each coordinate. And when the user devices 20A-N include tablet or smartphone computing devices, the line is drawn between the coordinates as the "touchmove" HTML event is captured at each coordinate. In both instances, the method context.lineTo(X, Y) may be invoked, for example.

In step S425, upon selection of an email button, such as by clicking of the screen of the Smart Staffing Application 22, a screen shot of the current page of the Smart Staffing Application 22 that includes the line drawings and the application background is captured. The screen shot of the Smart Staffing Application 22 with the line drawings may be captured using a commercially available plugin tool, such as the JavaScript HTML2Canvas tool, which allows screenshots to be taken of a web page that is displayed in a web browser, for example. The plugin tool may reside on the user devices 20A-N to capture the HTML on the page including all of the HTML Document Object Model (DOM) and the canvas element into an image and creates an HTML5 wrapper canvas element. The created wrapper canvas element encodes the captured image as a base64 string, such as an HTML data Uniform Resource Identifier (URI) scheme.

Use of such a base 64 string allows a normally separate image element to be embedded within a document instead of as a separate attachment file (e.g., PNG or JPEG). The base 64 string may save network bandwidth and may be necessary in an environment where the Smart Staffing Application 22 is a thin client, such as an application that runs in a web browser. In addition, use of a base 64 string may provide enhanced security when the Smart Staffing Application 22 is executed via Hypertext Transfer Protocol Secure (HTTPS) in comparison to transmitting the image as an attachment file in PNG or JPEG format.

In step S430, the wrapper canvas may be transmitted to the Smart Staffing Engine 62 via an asynchronous JavaScript+XML (AJAX) POST method call in order to request encoding of the base64 string as a JPEG, PDF, PNG, or other binary image file. The AJAX POST method request may include the email address of the user logged into the Smart Staffing Application 22. The Smart Staffing Engine 62 provides base64 string encoding/decoding API services and resides on the Smart Staffing Server 61.

In step S435, a JPEG image is received in response to the API call to the Smart Staffing Engine 62. Moving now to step S440, the JPEG image is sent to an email application via a method call. Subsequently, in step S445, the email application sends the JPEG file to one or more recipients as an email attachment.

Figure 5:
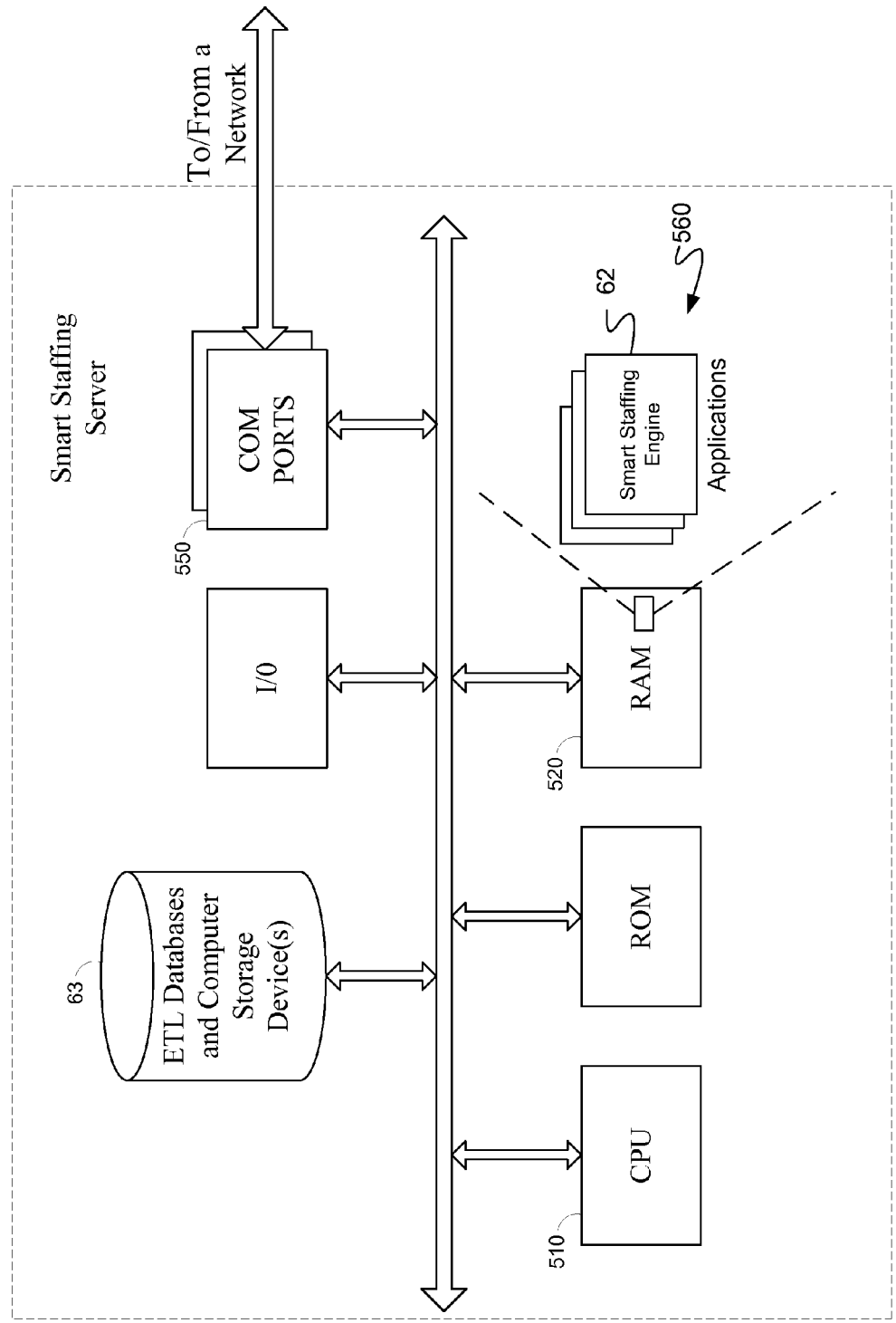
FIG. 5 is a simplified functional block diagram of a computer that may be configured as a server or host to function as any of the computer platforms in FIG. 1, for example, the Smart Staffing Server shown in the system of FIG. 1.

FIG. 5 is a simplified functional block diagram of a computer that may be configured as a server or host to function as any of the computer platforms in FIG. 1, for example, the Smart Staffing Server 61 shown in the system of FIG. 1.

The Smart Staffing Server 61 includes a CPU 510, in the form of one or more processors, for executing program instructions. Although the processor(s) forming the CPU 510 may be similar to the microprocessor used in the mobile device 20 of FIG. 6, host or server computer platforms typically use somewhat different circuit architectures, e.g. to provide more processor power. Smart Staffing Server 61 also includes a memory 520, shown as RAM, that is accessible to the processor to execute various programming instructions. The memory 520 typically stores programming, such that execution of the programming by the processor 510 configures the Smart Staffing Server 61 to perform the functions or procedures as described above. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

In this particular example, the Smart Staffing Server 61 is shown as including the ETL Databases 63 discussed earlier. The ETL Databases 63 are accessible to the central processing unit (CPU) 510 of the Smart Staffing Server 61.

For packet data communication, Smart Staffing Server 61 includes a data/network communication interface, shown generally as com ports 550. The com ports 550 may use any available data communication technology. In a fixed installation, for example, the com ports 550 may include an Ethernet interface card for communication over appropriate data network wiring. For a wireless implementation, the com ports 550 may include a WiFi transceiver. The com ports 550 allow the Smart Staffing Server 61 to communicate with other devices and systems, such as Smart Staffing Application 22 of user devices 20A-N, Retail Store Server 44 of Retail Store Systems 40A-N, and Traffic Server 51 of Traffic Vendor Systems 50A-N.

In the illustration, Smart Staffing Server 61 includes applications 560 stored in RAM 520, and more specifically, a Smart Staffing Engine 62. The Smart Staffing Engine 62 is tasked with capturing retail store data, determining store-level and aggregated metrics, and other steps of FIGS. 2-4 discussed earlier. In general, the term "engine" and "application," as used herein, refers to logic embodied in hardware or software instructions, which can be written in a programming language, such as Java™, C, C++, C Sharp, for example. A software engine or application can be compiled into executable programs or written in interpreted programming languages, such as Perl, Visual Basic script, HTML, or JavaScript. Software engines or applications may be callable from other engines or applications. Generally, the engines or applications described herein refer to logical modules that may be merged with other modules or divided into sub-module despite their physical organization. The engines or applications can be stored in any type of computer readable medium or computer storage device and be executed by one or more general purpose computers. In addition, the methods and processes disclosed herein can alternatively be embodied in specialized computer hardware or an application specific integrated circuit (ASIC).

Figure 6:
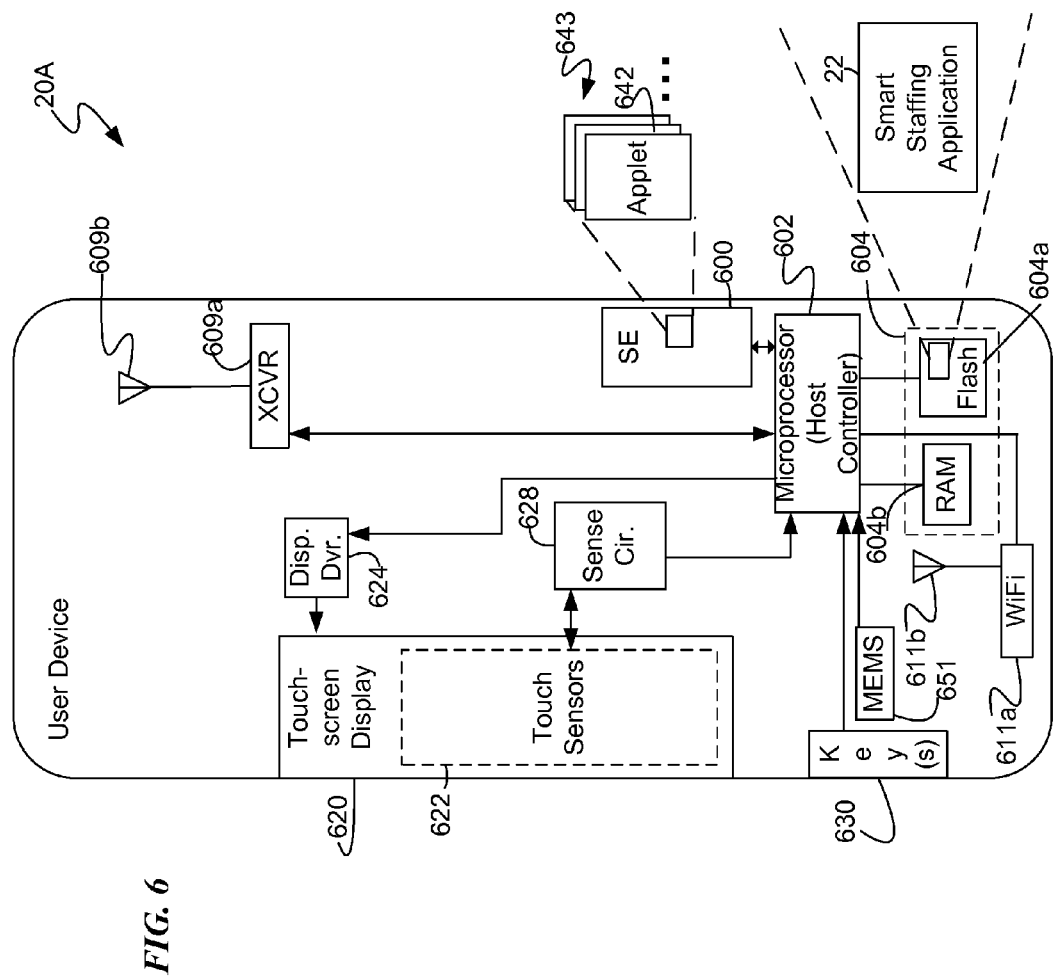
FIG. 6 is a high-level functional block diagram of a mobile device, which may be a user device that communicates via the system of FIG. 1.

FIG. 6 is a high-level functional block diagram of an example of a mobile device 20, which may be one of the user devices 20A-N that communicates via the system 5 of FIG. 1. Shown are elements of a touch screen type of mobile device 20 having the Smart Staffing Application 22 loaded, although other non-touch type mobile devices can be used in the prior token-based communications under consideration here. Examples of touch screen type mobile devices that may be used include (but are not limited to) a smart phone, a personal digital assistant (PDA), a tablet computer or other portable device. However, the structure and operation of the touch screen type devices 15 is provided by way of example; and the subject technology as described herein is not intended to be limited thereto. For purposes of this discussion, FIG. 6 therefore provides a block diagram illustration of the example of mobile device 20 having a touch screen display for displaying content and receiving user input as (or as part of) the user interface.

The activities that are the focus of discussions here typically involve data communications. As shown in FIG. 6, the mobile device 20 includes at least one digital transceiver (XCVR) 609a, for digital wireless communications via a wide area wireless mobile communication network, although the device 20 may include additional digital or analog transceivers (not shown). The transceiver 609a (network communication interface) conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, transceiver 609a provides two-way wireless communication of information including digitized audio signals, still image and/or video signals, web page information for display as well as web related inputs, and various types of mobile message communications to/from the mobile device 20.

Several of these types of communications through the transceiver 609a and a network, as discussed previously, relate to protocols and procedures in support of communications with the Smart Staffing Server 61 to retrieve and display one or determined metrics at a store, district, region, area, or national level in near real time or real time. Such communications, for example, may utilize IP packet data transport utilizing the digital wireless transceiver (XCVR) 609a and over the air communications to and from a base station (not shown), the Internet 10, the Intranet 25 to and from the Smart Staffing Server 61 shown in FIG. 1.

In one example, the transceiver 609a sends and receives a variety of signaling messages in support of various data services provided by a network of a wireless service provider, to user(s) of mobile device 20 via a mobile communication network (not shown). Transceiver 609a connects through radio frequency (RF) send-and-receive amplifiers (not shown) to an antenna 609b.

Many modern mobile device(s) 20 also support wireless local area network communications over WiFi, instead of or in addition to data communications using the wide area mobile communication network. Hence, in the example of FIG. 6, for packet data communications, device 20 may also include a WiFi transceiver 611a and associated antenna 611b. Although WiFi is used here as the example, the transceiver 611a may take the form of any available two-way wireless local area network (WLAN) transceiver of a type that is compatible with one or more standard protocols of communication implemented in wireless local area networks, such as one of the WiFi standards under IEEE 802.11 and/or WiMAX.

The transceiver 611a, for example, may provide two-way data transport for wireless communication with a wireless access point in a residence or enterprise that the user frequents or with any available hotspot offered in a public venue. A WiFi access point (not shown), communicates with compatible user equipment, such as the device 20, over the air using the applicable WiFi protocol. The WiFi access point provides network connectivity, usually to the Internet 10. In a home or office premises, for example, the WiFi access point would connect directly or via a local area network (LAN) to a line providing internet access service. In a more public venue, an access point configured as a hotspot may offer similar connectivity for customers or others using the venue, on terms and conditions set by the venue operator. Although communicating through a different network or networks, the transceiver 611a supports various types of data communications similar to the packet data communications supported via the mobile network transceiver 609a, including communications related to communications to and from Smart Staffing Server 61 and the other devices shown in FIG. 1.

The mobile device 20 further includes a microprocessor, sometimes referred to herein as the host controller 602. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 602, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in mobile device 20, Retail Store Server 44, Traffic Server 51, Smart Staffing Server 61, other devices and server computers, network elements, etc.

Returning more specifically to the mobile device 20 example of FIG. 6, the microprocessor 602 serves as a programmable host controller for device 20 by configuring device 20 to perform various operations, for example, in accordance with instructions or programming executable by processor 602. For example, such operations may include various general operations of the mobile device 20, as well as operations related to communications with Smart Staffing Server 61. Although a processor may be configured by use of hardwired logic, typical processors in mobile devices are general processing circuits configured by execution of programming.

The mobile device 20 includes a memory or storage system 604, for storing data and programming. In the example, the memory system 604 may include a flash memory 604a and a random access memory (RAM) 604b. The RAM 604b serves as short term storage for instructions and data being handled by the processor 602, e.g. as a working data processing memory. The flash memory 604a typically provides longer term storage.

Hence, in the example of mobile device 20, the flash memory 604a is used to store programming or instructions for execution by the processor 602. Depending on the type of device, the device 20 stores and runs a mobile operating system through which specific applications, including Smart Staffing Application 22 (which may be a web browser executing a dynamic web page), run on the device 20. Examples of mobile operating systems include Google Android, Apple iOS (I-Phone or iPad devices), Windows Mobile, Amazon Fire OS, RIM BlackBerry operating system, or the like. Flash memory 604a may also be used to store mobile configuration settings for different mobile applications or services executable at device 20 using processor 602.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions or programming may be used to implement any other device functions associated with communications for displaying both retail store and aggregated metrics determined by the Smart Staffing Server 61 on mobile device 20. Program aspects of the technology may be thought of as "products" or "articles of manufacture" typically in the form of executable code or process instructions and/or associated data that is stored on or embodied in a type of machine or processor readable medium (e.g., transitory or non-transitory), such as one of the memories 604a, 604b of memory system 604, or a memory of a computer used to download or otherwise install such programming into the mobile device, or a transportable storage device or a communications medium for carrying program for installation in the mobile device 20.

In the example, the flash memory 604a stores applications for execution by the microprocessor-based host controller 602, typically through operation/execution of the device operating system. Of note, for purposes of the present discussion, the flash memory 604 stores a Smart Staffing Application 22 as one of the programs for execution by the microprocessor 602. Execution of Smart Staffing Application 22 by the microprocessor 602 configures mobile device 20 to perform a variety of functions, particularly to retrieve and display metrics at retail store, district, region, area, and national levels. In the example, Smart Staffing Application 22 also engages in communications with the Smart Staffing Server 61 to capture user annotated line drawings made on the screen of the Smart Staffing Application 22 to highlight displayed metrics, and email the captured image to one or more email recipients as an attached image file.

In the illustrated example, the mobile device 20 includes a secure component 600. The secure component 600 (e.g. a secure element or "SE") may be provisioned as a section within the memory 604 or may take the form of a universal integrated circuit card (UICC) located within the device 15. A common example of a UICC implementation of the SE 600 is a subscriber identity module (SIM). As discussed above, the SE provides secure storage for various identifiers associated with mobile device 20. The SE typically has a unique identifier and is provisioned for operation of the mobile device 20 in the network 10 by storage of a mobile directory number (MDN) and/or mobile identification number (MIN) assigned to the device 20 by the carrier network operator.

The secure component contains applications that use secure keys running inside the secure processor. Although similar to other applications, the applications for the secure processor are sometimes smaller and sometimes referred to as applets 643. In an example, Smart Staffing Application 22 may be an applet residing in the SE 600. For example, there may be at least one applet 642 to engage in communications via Internet 10 to retrieve and display store-level and aggregated metrics in real time.

The mobile device 20 may include a variety of different types of physical user interface elements to interact with the Smart Staffing Application 22. For discussion purposes, in the device 20 shown in FIG. 6, the physical user interface elements of device 20 includes a touch screen display 620 (also referred to herein as "touch screen 620" or "display 620") to support gestures. For output purposes, the touch screen 620 includes a display screen, such as a liquid crystal display (LCD) or the like. For input purposes, touch screen display 620 includes a plurality of touch sensors 622.

A keypad may be implemented in hardware as a physical keyboard of mobile device 20, and keys may correspond to hardware keys of such a keyboard. Alternatively, some or all of the keys 630 (and keyboard) of device 20 may be implemented as "soft keys" of a virtual keyboard graphically represented in an appropriate arrangement via touch screen display 620. The soft keys presented on the touch screen display 620 may allow the user of device 20 to invoke the same user interface functions as with the physical hardware keys for authentication purposes.

In general, touch screen display 620 and touch sensors 622 (and one or more keys 630, if included) are used to provide a textual and graphical user interface for the mobile device 20. In an example, touch screen display 620 provides viewable content to the user at device 20. Touch screen display 620 also enables the user to interact directly with the viewable content provided in the content display area, typically by touching the surface of the screen with a finger or an implement such as a stylus.

As shown in FIG. 6, the mobile device 20 also includes a sense circuit 628 coupled to touch sensors 622 for detecting the occurrence and relative location/position of each touch with respect to a content display area of touch screen display 620. In this example, sense circuit 628 is configured to provide processor 602 with touch-position information based on user input received via touch sensors 622. In some implementations, processor 602 is configured to correlate the touch position information to specific content being displayed within the content display area on touch screen display 620. The touch-position information captured by the sense circuit 628 and provided to processor 602 may include, but is not limited to, coordinates identifying the location of each detected touch with respect to the display area of touch screen display 620 and a timestamp corresponding to each detected touch position. Accordingly, the processor 602 may determine input of a phone number, a token, or menu identifiers selected during audible scripts, for example.

Figure 7:
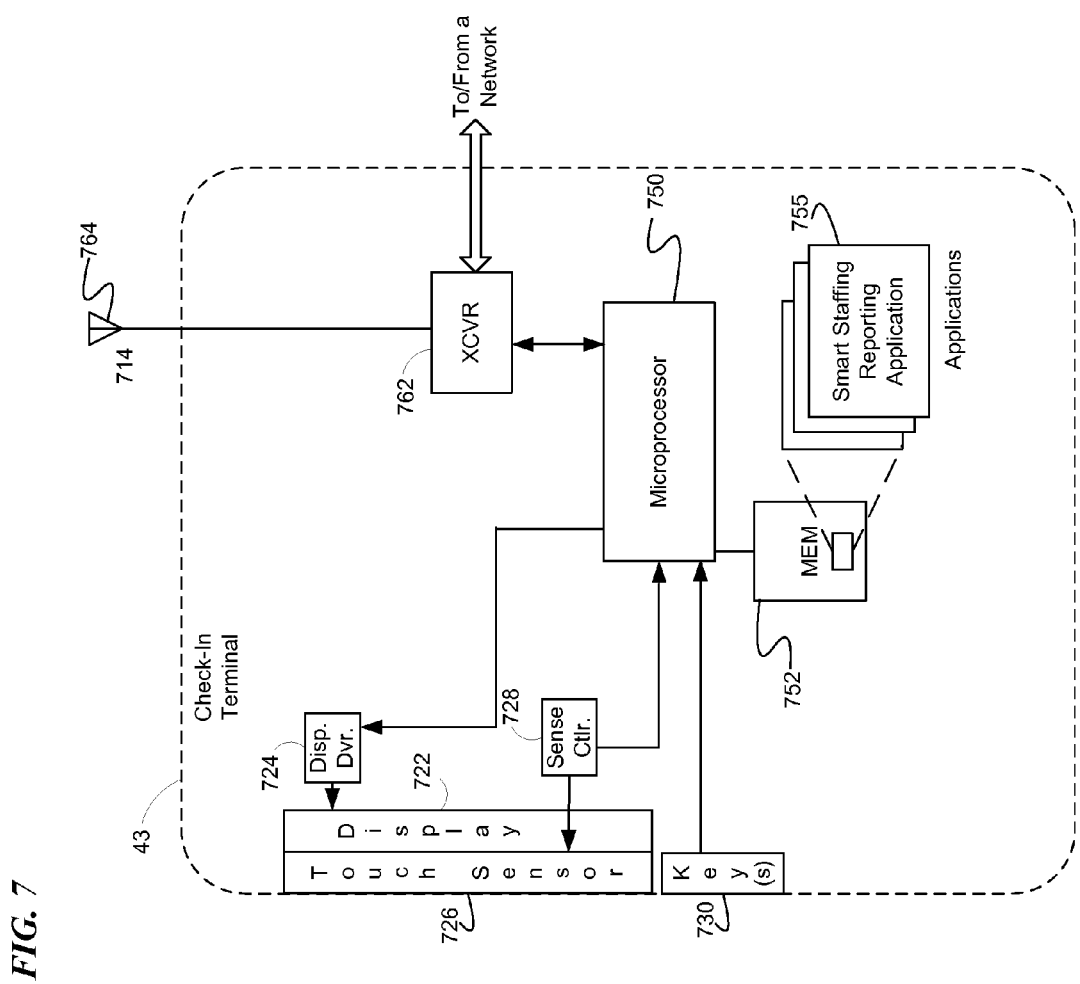
FIG. 7 is a high-level functional block diagram of a Check-In Terminal computing device that communicates via the system of FIG. 1.

FIG. 7 is a block diagram of a Check-in Terminal computing device 43 that communicates via the system 5 of FIG. 1. By way of example, the Check-In Terminal device 43 may be implemented as a tablet computer including many of the same elements as the user device 20 of FIG. 6 and Smart Staffing Server 61 of FIG. 5.

The Check-In Terminal 43 shown in FIG. 7 includes a display 722 and touch sensor 726 controlled by display driver 724 and sense control circuit 728 respectively. The Check-In Terminal 43 may also include keys 730 that provide additional input. Although they may be arranged/sized somewhat differently, the elements 722 to 728 are generally similar to the display, touch sensor, display driver and sense control circuit discussed above relative to the mobile device 20 example of FIG. 6. Of course other user interface hardware components may be used in place of or instead of the display, touch sensor and keys, depending on the expected type of Check-In Terminal device 43 (e.g., wearable devices).

Like the earlier equipment examples, Check-In Terminal device 43 includes one or more processor circuits implementing a CPU functionality for data processing and operational control. Although a microcontroller or other type of processor circuit may be used, in the example, the CPU processor of the Check-In Terminal device 43 takes the form of a microprocessor 750. The structure of the microprocessor 750 may be similar to that of microprocessors discussed earlier.

Programs and data for the microprocessor 750 are stored in a memory 752. Similar to the mobile device 20 of FIG. 6, the memory 752 may include both random access memory and flash memory, or even a SE, although fixed implementations of the Check-In Terminal 43 can be less constrained by the size and power constraints for mobile devices and therefore can use a wider variety of memory types to best suit the expected functionality of the Check-In Terminal device 43 type. However, similar constraints can exist when the Check-In Terminal 43 is a wearable device or the like.

The Check-In Terminal 43 also includes a data communication interface for packet data communication, shown as a transceiver (XCVR) 762, which is coupled to antenna 764. Transceiver 762 engages in digital wireless communications via a wide area wireless mobile communication network or using WiFi. Transceiver 762 allows the Check-In Terminal 43 to communicate with server systems, such as the Retail Store Server 44. In addition, the Check-In Terminal device 43 may include additional digital or analog transceivers (not shown).

The keys 730, display driver 724, sense control circuit 768, transceiver 762, and memory 752 are all coupled to the microprocessor 750. Operation of Check-In Terminal 43 is controlled by microprocessor execution of programming from the memory 752. In the illustration, memory 752 includes Smart Staffing Reporting Application 755 to conduct communications and processing for reporting check-ins by customers checking in at the retail store to enter the waiting queue for service and employees logging in and out of work, as discussed in the earlier procedures.

Aspects of the methods of capturing retail store data, determining store-level and aggregated metrics, and displaying the determined metrics as outlined above may be embodied in programming, for example, for one or more server and/or for mobile devices. Program aspects of the technology may be thought of as "products" or "articles of manufacture" typically in the form of executable code and/or associated data that is carried on or embodied in a type of machine readable medium. Executable code, for example, may take the form of software, firmware, microcode or the like of a type suitable for execution by the particular processor hardware of the user devices 20A-N, Retail Store Server 44, Traffic Server 51, and Smart Staffing Server 61 so as to configure the respective equipment to perform functions like those discussed herein.

"Storage" type media include any or all of the tangible memory of the computers, mobile devices, processors or the like, or associated modules thereof, such as various semiconductor memories, tape drives, disk drives and the like, which may provide non-transitory storage at any time for the programming. All or portions of the programming may at times be communicated through the Internet or various other telecommunication networks. Such communications, for example, may enable loading of the software or modules from one computer or processor into another, for example, from a management server or host computer of the enterprise offering the capture of retail store data and aggregated metrics service into the computer platform of the Retail Store Server 44, Traffic Server 51, or Smart Staffing Server 61; downloading the Smart Staffing Application 22 into the user devices 20A-N; or downloading the Smart Staffing Reporting Application 755 into any or all of the Check-In Terminal(s) 43 of the Retail Store Systems 40A-N. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s), mobile devices or the like, such as may be used to implement the secure payment processing techniques discussed herein. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Figure 8A:
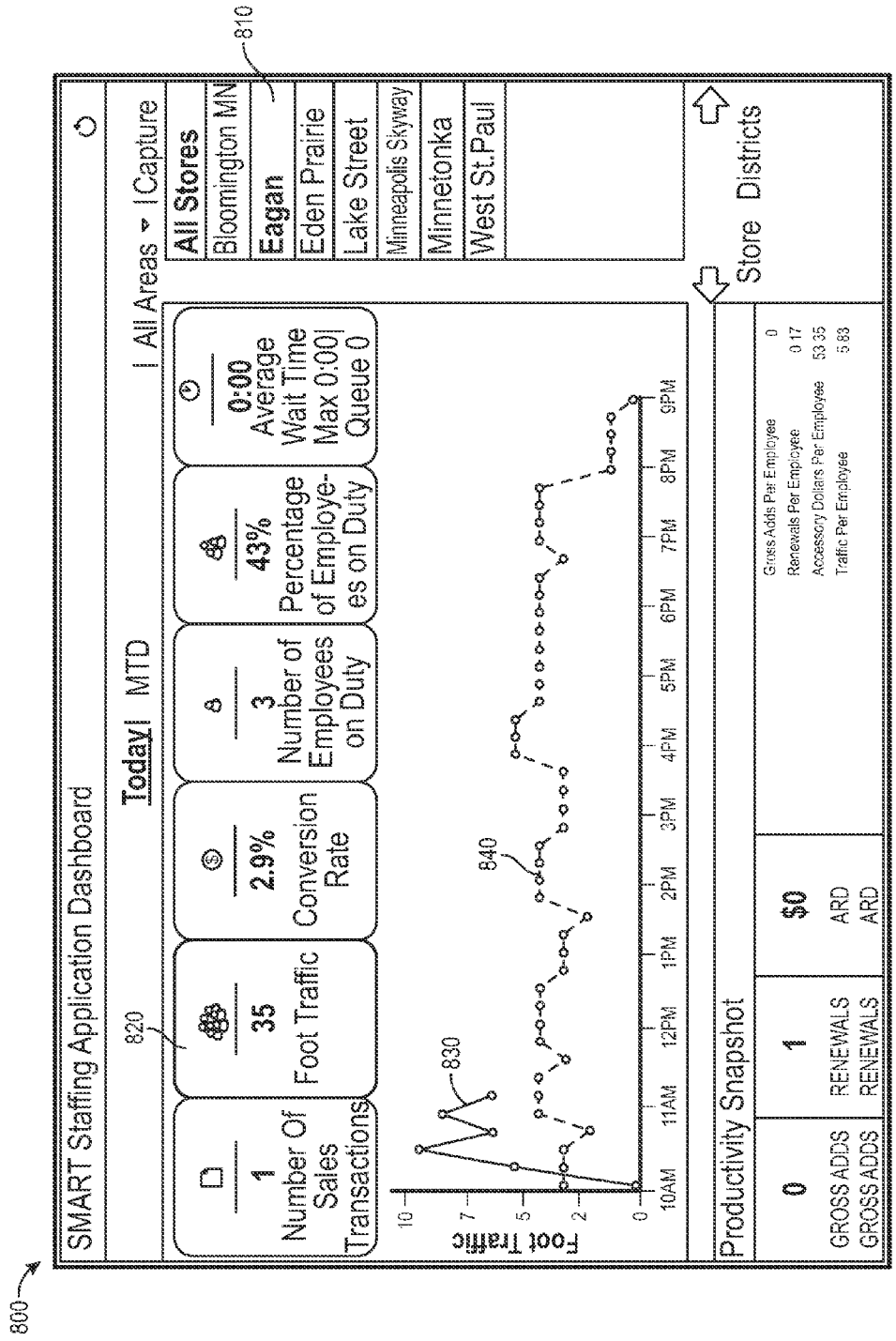
FIG. 8A is a graphical user interface of a dashboard for a Smart Staffing Application that displays graphs and determined metrics at a retail store level.

FIG. 8A is a graphical user interface ("GUI") of a dashboard for a Smart Staffing Application 22 that displays graphs and determined metrics at a retail store level in a daily view. As shown, the dashboard 800 of the Smart Staffing Application 22 allows the user to view one or more determined metrics for a retail store. A particular retail store 810 has been selected by a user, hence the actual determined metrics and forecasted metrics are displayed for the selected retail store in real time.

The dashboard 800 shows the determined metrics for the selected retail store, including number of sales transactions, foot traffic 820, conversion rate, number of employees on duty, percentage of employees on duty, and average wait time. In the example, the determined daily metrics are displayed and updated at or after a predetermined time interval in the dashboard 800. The foot traffic 820 metric is selected by the user in the example and, as a result, a first graph 830 is generated that displays the actual real time foot traffic 820 for the selected retail store and the first graph 830 is updated at or after the predetermined time interval. In addition, a second graph 840 of forecasted foot traffic is displayed upon selection of the foot traffic 820 metric for the district. The second graph 840 may be based on historical audited foot traffic data, as discussed earlier, and is plotted based on the historical audited foot traffic data. A productivity snapshot is also displayed that includes gross additions (Gross Adds) which is the number of customers signing up for new service plans, service renewals (Renewals) which is the number of customers renewing their existing service plan, and accessories per device (ARD) which is the dollar amount of accessories sold with each product. In addition, productivity per employee metrics are displayed as part of the productivity snapshot, which include gross additions per employee (Gross Adds per Employee), service renewals per employee, accessory dollars per employee, and foot traffic per employee.

Figure 8B:
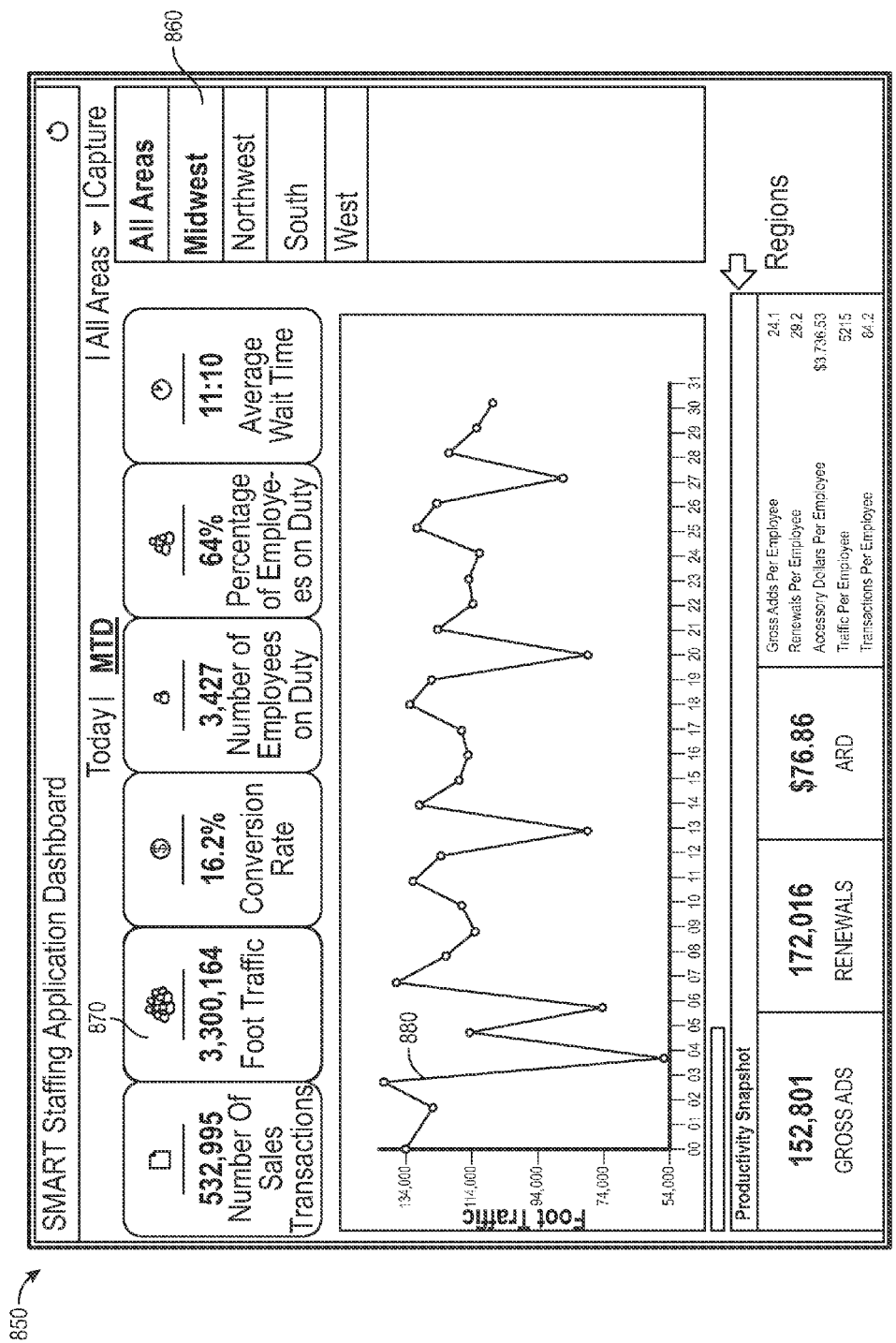
FIG. 8B is a graphical user interface of a dashboard for a Smart Staffing Application that displays graphs and determined metrics at an area level.

FIG. 8B is a GUI of a dashboard for a Smart Staffing Application 22 that displays graphs and determined metrics at an area level in a monthly view. As shown, the dashboard 850 of the Smart Staffing Application 22 allows the user to view one or more determined metrics for an area. As shown, an area 860 has been selected by a user, hence the actual determined metrics are displayed for the selected area in real time.

The dashboard 850 shows the determined metrics for the selected area, including number of sales transactions, foot traffic 870, conversion rate, number of employees on duty, percentage of employees on duty, and average wait time. In the example, the determined month to date (MTD) metrics are displayed. The foot traffic 870 metric is selected by the user in the example and, as a result, a first graph 880 is plotted that displays the actual real time foot traffic 870 for the selected area. A productivity snapshot for the selected area on a MTD basis is also displayed, and the productivity snapshot includes the same metrics as FIG. 8A. In addition, the number of sales transactions per employee is included within the productivity snapshot.

Figure 9A:
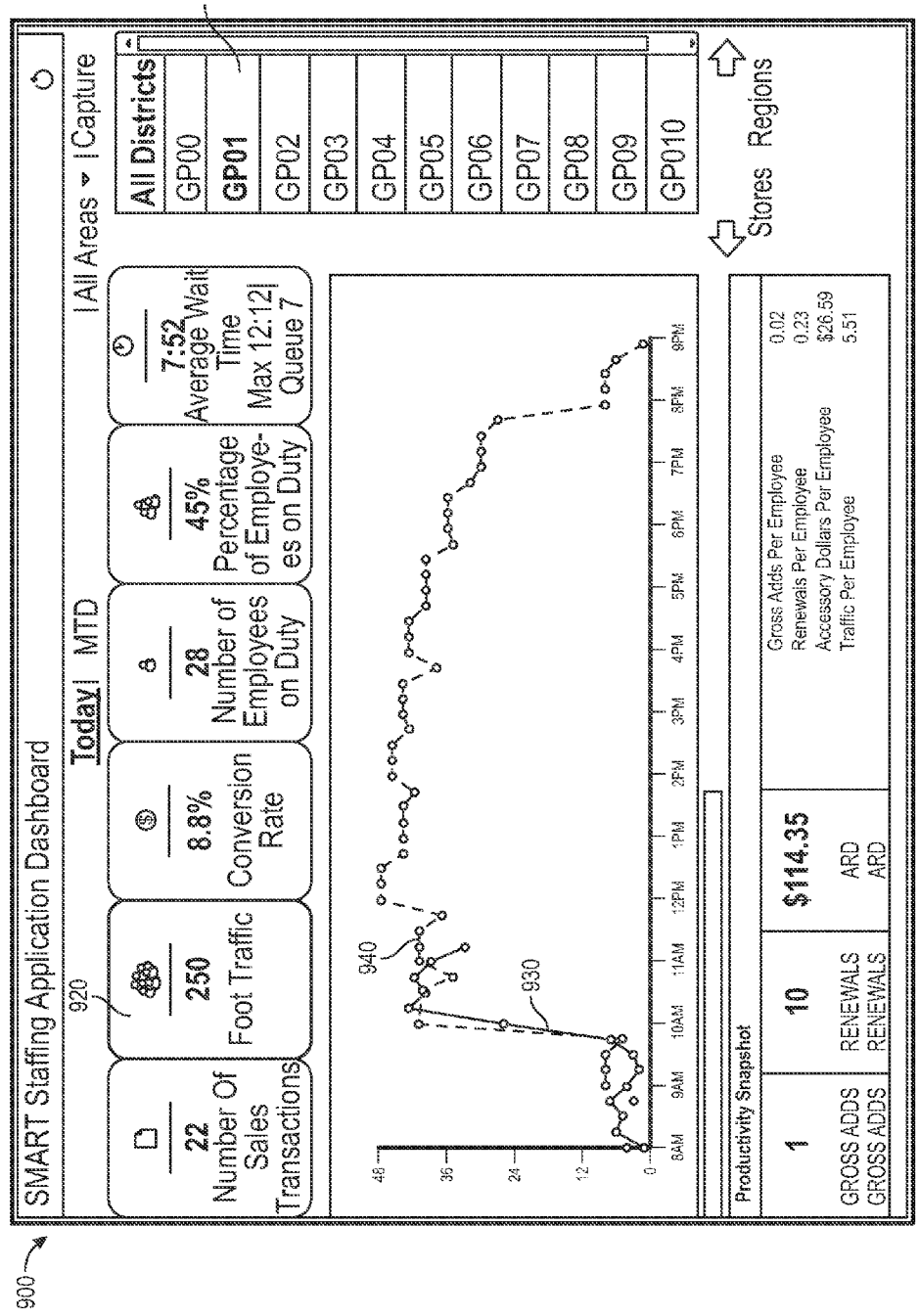
FIG. 9A is a graphical user interface of a dashboard for a Smart Staffing Application that displays graphs and determined metrics at a district level.

FIG. 9A is a GUI of a dashboard for a Smart Staffing Application 22 that displays graphs and determined metrics at a district level in a daily view. As shown, the dashboard 900 of the Smart Staffing Application 22 allows the user to view one or more determined metrics for a district. As shown, a district 910 has been selected by a user, hence the actual determined metrics and forecasted metrics are displayed for the selected district in real time.

The dashboard 900 shows the determined metrics for the selected district, including number of sales transactions, foot traffic 920, conversion rate, number of employees on duty, percentage of employees on duty, and average wait time. In the example, the determined daily metrics are displayed and updated at or after a predetermined time interval in the dashboard 900. The foot traffic 920 metric is selected by the user in the example and, as a result, a first graph 930 is generated that displays the actual real time foot traffic 920 for the selected district and the first graph 930 is updated at or after a predetermined time interval. In addition, a second graph 940 of forecasted foot traffic is displayed upon selection of the foot traffic 920 metric for the district. The second graph 840 may be based on historical audited foot traffic data, as discussed earlier, and may be adjusted upwards or downwards at or after each predetermined time interval for the district. A productivity snapshot for the selected district on the given day is also shown.

Figure 9B:
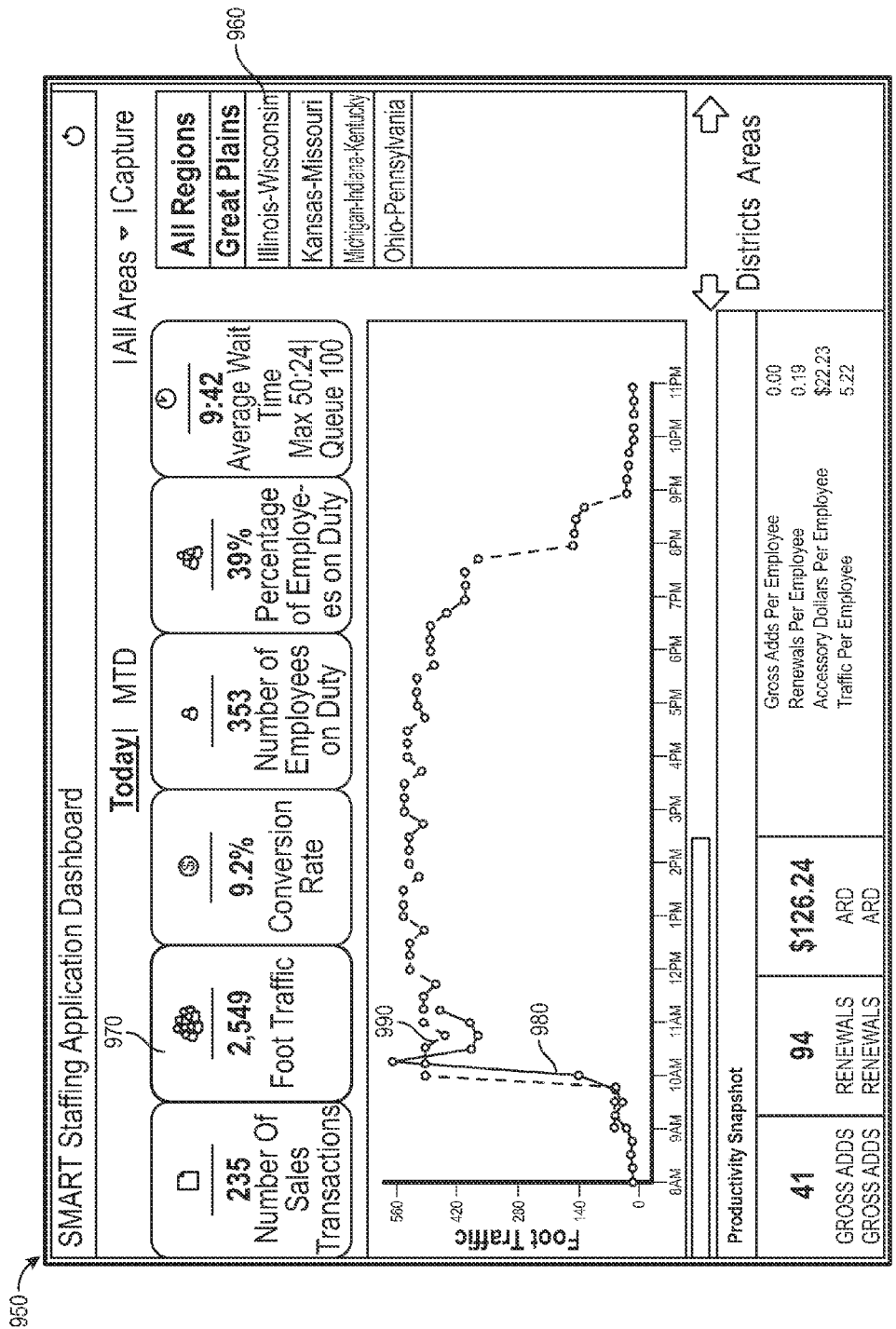
FIG. 9B is a graphical user interface of a dashboard for a Smart Staffing Application that displays graphs and determined metrics at a region level.

FIG. 9B is a GUI of a dashboard for a Smart Staffing Application 22 that displays graphs and determined metrics at a region level in a daily view. As shown, the dashboard 950 of the Smart Staffing Application 22 allows the user to view one or more determined metrics for a region. As shown, a region 960 has been selected by a user, hence the actual determined metrics and forecasted metrics are displayed for the selected region in real time.

The dashboard 950 shows the determined metrics for the selected region, including number of sales transactions, foot traffic 970, conversion rate, number of employees on duty, percentage of employees on duty, and average wait time. In the example, the determined daily metrics are displayed and updated at or after a predetermined time interval in the dashboard 950. The foot traffic 970 metric is selected by the user in the example and, as a result, a first graph 980 is generated that displays the actual real time foot traffic 970 for the selected region and the first graph 980 is updated at or after a predetermined time interval. In addition, a second graph 990 of forecasted foot traffic is displayed upon selection of the foot traffic 920 metric for the region. The second graph 990 may be based on historical audited foot traffic data, as discussed earlier, and is adjusted upwards or downwards at or after each predetermined time interval for the region. A productivity snapshot for the selected region on the given day is also shown.

Figure 10A:
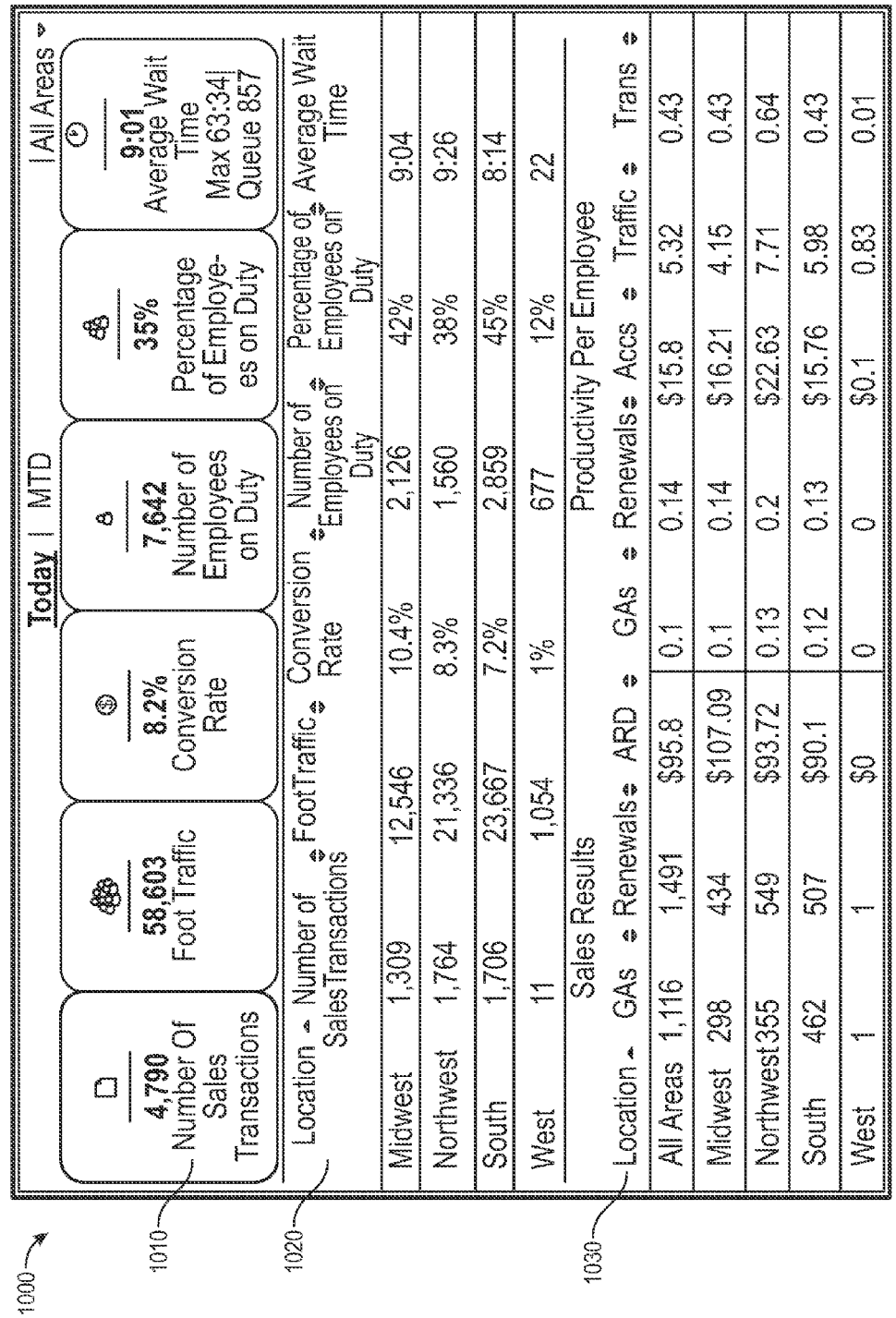
FIG. 10A is a graphical user interface of a dashboard for a Smart Staffing Application that displays tables and determined metrics at an area level.

FIG. 10A is a GUI of a dashboard for a Smart Staffing Application 22 that displays tables and determined metrics at an area level. As shown, the dashboard 1000 of the Smart Staffing Application 22 allows the user to view one or more determined metrics for a plurality of areas for cross-comparison purposes. All of the areas have been selected by a user, hence the actual determined metrics for all of the areas are aggregated together at the nation level and displayed in a first GUI area 1010 of the dashboard 1000.

As further shown in a second GUI area 1020, the determined metrics for each of the areas are displayed at once. Hence, the determined metrics for each area, including number of sales transactions, foot traffic, conversion rate, number of employees on duty, percentage of employees on duty, and average wait time are shown for cross-comparison purposes. Accordingly, the user may gain insight into how each area is performing relative to one another.

In a third GUI area 1030 of the dashboard 1000, additional metrics are shown, including specific sales results metrics and productivity per employee metrics that are broken out on an areas level basis. The sales results include gross additions (GAs), service renewals (Renewals), and accessories per device (ARD). The productivity per employee metrics are also displayed which include gross additions per employee (GAs), renewals per employee (Renewals), accessory dollars per employee (Accs), foot traffic per employee (Traffic), and transactions per employee (Trans).

Figure 10B:
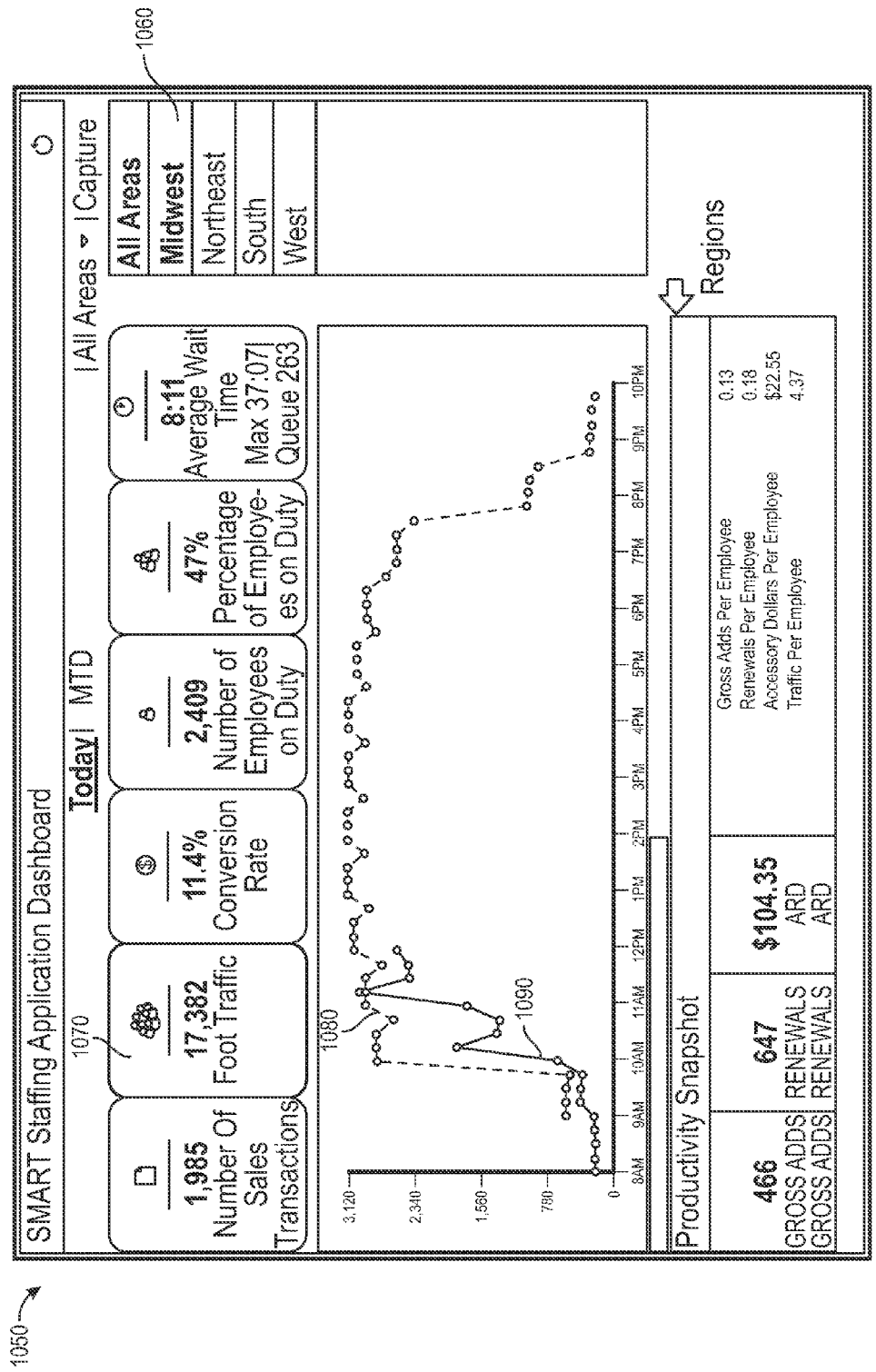
FIG. 10B is a graphical user interface of a dashboard for a Smart Staffing Application that displays graphs and determined metrics at an area level.

FIG. 10B is a graphical user interface of a dashboard for a Smart Staffing Application that displays graphs and determined metrics at an area level in a daily view. As shown, the dashboard 1050 of the Smart Staffing Application 22 allows the user to view one or more determined metrics for an area. As shown, an area 1060 has been selected by a user, hence the actual determined metrics and forecasted metrics are displayed for the selected area in real time.

The dashboard 1050 shows the determined metrics for the selected area, including number of sales transactions, foot traffic 1070, conversion rate, number of employees on duty, percentage of employees on duty, and average wait time. In the example, the determined daily metrics are displayed and updated at or after a predetermined time interval in the dashboard 1050. The foot traffic 1070 metric is selected by the user in the example and, as a result, a first graph 1080 is generated that displays the actual real time foot traffic 1070 for the selected area and the first graph 1080 is updated at or after a predetermined time interval. In addition, a second graph 1090 of forecasted foot traffic is displayed upon selection of the foot traffic 1070 metric for the area. The second graph 1090 may be based on historical audited foot traffic data, as discussed earlier, and is adjusted upwards or downwards at or after each predetermined time interval for the area. A productivity snapshot is also displayed for the selected area on the given day.

Figure 11A:
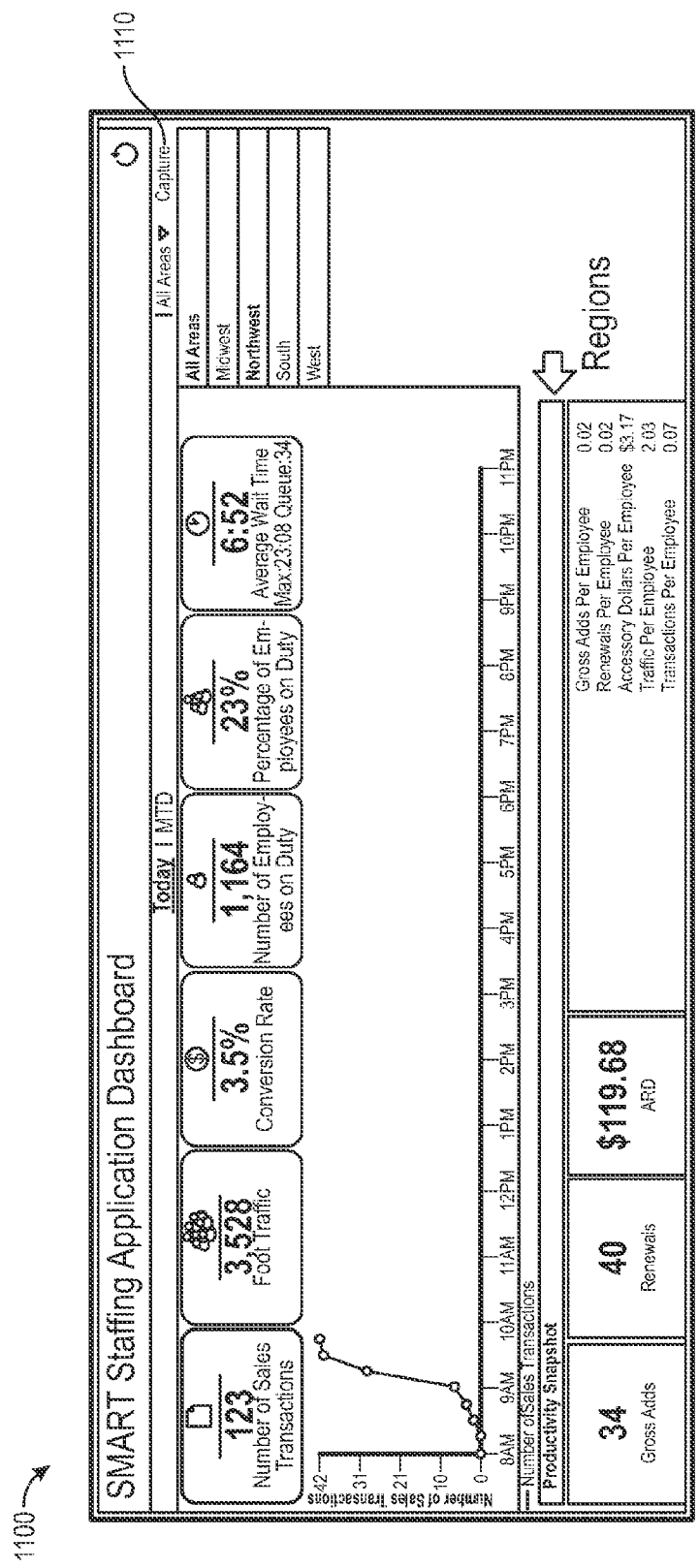
FIG. 11A is a graphical user interface of a dashboard for a Smart Staffing Application that enables capture and emailing of a screenshot of the application screen with annotations and markup drawn by a user.

FIG. 11A is a graphical user interface of a dashboard for a Smart Staffing Application 22 that enables capture and emailing of a screenshot of the application screen 1100 with annotations and markup drawn by a user. As shown, the application screen 1100 includes a capture button 1110. After drawing annotations and markup 1160 as shown in FIG. 11B, the user selects the capture button 1110 to take an image capture of the application screen, as described earlier in FIGS. 1, 2, and 4.

Figure 11B:
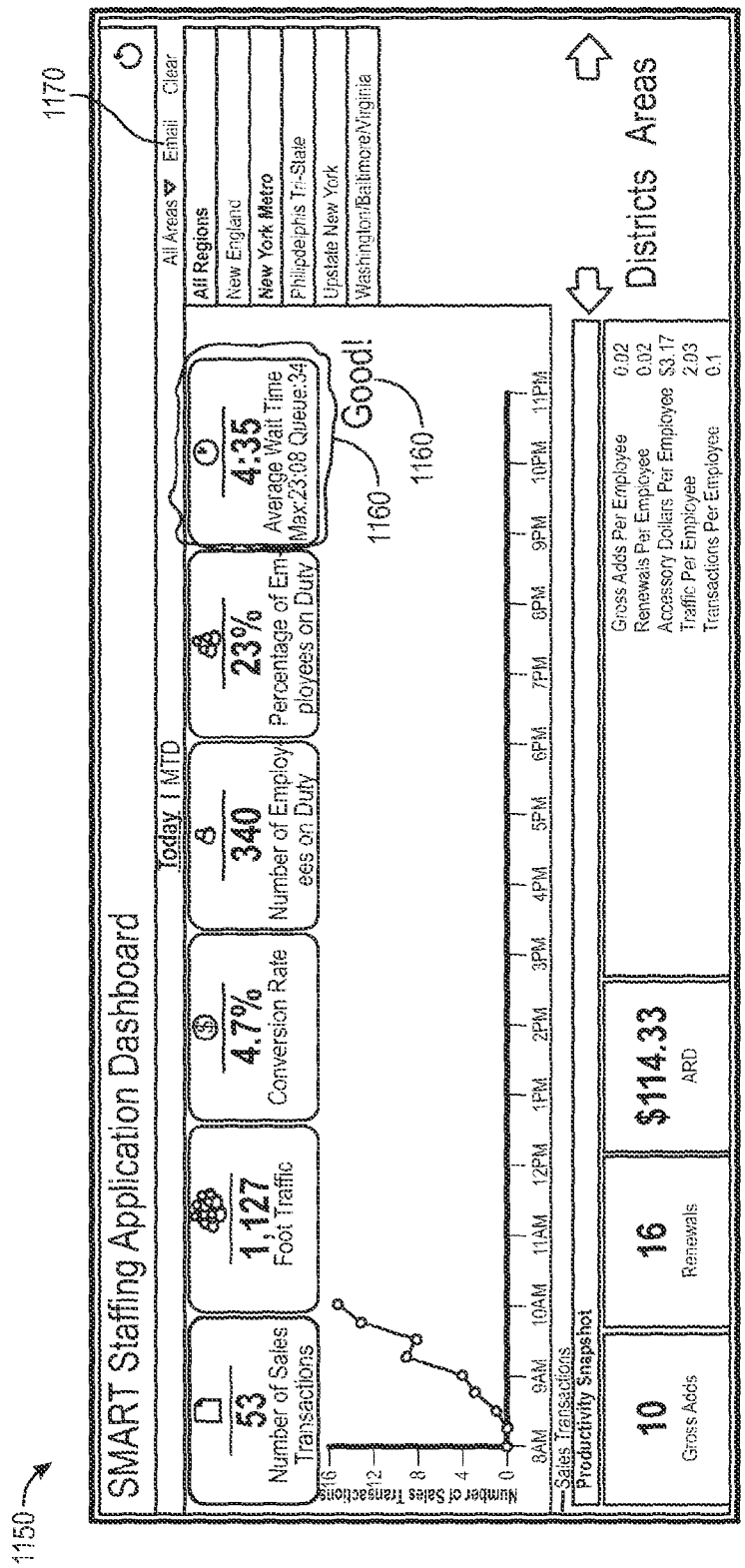
FIG. 11B is a graphical user interface of a dashboard for a Smart Staffing Application that allows annotations and markup to be drawn by a user, and capture and email of the marked up and annotated application screen.

FIG. 11B is a graphical user interface of a dashboard for a Smart Staffing Application 22 that allows annotations and markup to be drawn by a user, and capture and email of the application screen 1150 with user drawn annoations and markup. As shown, the user draws line annotations 1160 that include a circle around the average wait time metric and annotates the average wait time metric with text "Good!" The user subsequently selects the capture button 1110 of the application screen 1100 of FIG. 11A. Upon selecting the capture button 1110, Smart Staff Application 22 generates an application screen 1150 including the email button 1170. Selection of the email button 1170 allows the user to email an image of the application screen 1150 with user drawn annotations and markup 1160 to a desired list of recipients, as described above in FIGS. 1, 2, and 4.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
a camera connected to one or more networks;
one or more traffic servers connected to the one or more networks; and
one or more retail servers,
the one or more retail servers including one or more processors to:
receive images of foot traffic, captured by the camera, in a retail store;
transmit the images of the foot traffic to the one or more traffic servers for processing,
the one or more traffic servers being for tracking a customer in the retail store using a randomly generated identifier that is linked to a size, a speed, and a color of the customer in the images of the foot traffic and is not linked to an actual identity of the customer;
execute subroutines in parallel using multithreading, the subroutines including:
a first subroutine to extract traffic data from the one or more traffic servers and store the traffic data in a database,
the traffic data indicating a quantity of customers in the retail store based on the processed images of the foot traffic, and
a second subroutine to extract and store customer wait time data, resource management data, and point of sale (POS) data,
the customer wait time data being based on a check-in time at a customer mobile check-in terminal, that allows the customer to enter a unique identifier and enter a queue to receive support with one or more products or one or more services;
determine a first completion of the first subroutine executed in parallel with the second subroutine;
determine a second completion of the second subroutine executed in parallel with the first subroutine;
determine one or more metrics for the retail store based on the traffic data, the customer wait time data, the resource management data, and the POS data after determining the first completion of the first subroutine and after determining the second completion of the second subroutine;
load the one or more metrics into the database;
determine one or more aggregated metrics by aggregating the one or more metrics with other metrics at a geographic level;
load the one or more aggregated metrics into the database; and
transmit the one or more aggregated metrics to a smart staffing application of one or more user devices,
the one or more aggregated metrics being transmitted to the smart staffing application via the one or more networks when the one or more user devices come online and the smart staffing application requests the one or more aggregated metrics based on a defined time interval.

2. The system of claim 1, wherein the one or more processors are further to:
repeat execution of the first subroutine and the second subroutine at a predetermined time interval.

3. The system of claim 1, wherein, the one or more processors are further to:
store the one or more metrics in a time interval table,
the time interval table including a report date, a timestamp indicating a current time of day and a location identifier of the retail store.

4. The system of claim 3,
wherein, when determining the one or more aggregated metrics, the one or more processors are to:
combine the one or more metrics in the time interval table with other metrics in a plurality of time interval tables for a plurality of retail stores located in a district determine aggregated district metrics,
the retail store being one of the plurality of retail stores; and
wherein the one or more processors are further to:
store the aggregated district metrics in an aggregate district table,
the aggregate district table including the report date, the timestamp, and a location identifier of the district to uniquely identify the district, and
wherein the aggregated district metrics are determined in parallel using multithreading.

5. The system of claim 4,
wherein, when determining the one or more aggregated metrics, the one or more processors are to:
combine the aggregated district metrics with other metrics associated with a region to determine aggregated region metrics; and
wherein the one or more processors are further to:
store the aggregated region metrics in an aggregate region table,
the aggregate region table including the report date, the timestamp, and a location identifier of the region.

6. The system of claim 1, wherein, when determining the one or more metrics for the retail store, the one or more processors are to:
determine an average customer wait time, for each customer of a plurality of customers, by averaging a time between when each customer checks in at the customer mobile check-in terminal and a time when each customer checks out at a POS terminal;
select, from the average customer wait time for each customer, a particular average customer wait time associated with a largest wait time; and
determine a quantity of customers waiting during a particular time by calculating a quantity of customers, of the plurality of customers, that checked in at the customer mobile check-in terminal that have not checked out at the POS terminal.

7. The system of claim 1, wherein, when determining the one or more metrics for the retail store, the one or more processors are to:
determine a quantity of employees on duty during a particular time based on the resource management data by calculating a quantity of employees, of a plurality of employees, that logged in at the customer mobile check-in terminal that have not logged out at the customer mobile check-in terminal;
determine a quantity of sales transactions based on the POS data; and
determine a quantity of sales transactions per employee by dividing information identifying the quantity of sales transactions by information identifying the quantity of employees on duty.

8. The system of claim 1, wherein, when determining the one or more metrics for the retail store, the one or more processors are to:
determine one or more metrics related to the foot traffic by subtracting information identifying a quantity of customers exiting the retail store from information identifying a quantity of customers within the retail store to determine a first quantity and adding a quantity of customers entering the retail store to the first quantity to determine a second quantity.

9. The system of claim 1, wherein, when determining the one or more aggregated metrics, the one or more processors are to:
average conversion rates for a plurality of retail stores within a district to generate a conversion rate for the district,
the retail store being one of the plurality of retail stores.

10. The system of claim 1, wherein, when determining the one or more aggregated metrics, the one or more processors are to:
select a largest customer wait time for a plurality of retail stores within a district to generate a maximum customer wait time for the district,
the retail store being one of the plurality of retail stores including the retail store.

11. The system of claim 1, wherein the one or more processors are further to:
extract audited traffic data from the one or more traffic servers, and
load the audited traffic data into the database.

12. The system of claim 1, wherein the one or more processors are further to:
receive a screen capture of the smart staffing application, the screen capture including an annotation made by a user;
receive an application programming interface (API) method call requesting encoding of a base64 image string,
the base64 image string encoding the screen capture of the smart staffing application with the annotation made by the user;
encode the base64 image string as an image file; and
transmit the image file to the smart staffing application.

13. The system of claim 1, wherein the one or more processors, when determining the first completion of the first subroutine, are to:
determine the first completion of the first subroutine based on an empirically determined time period elapsing,
the empirically determined time period being based on past computing times to extract and store data from the one or more traffic servers.

14. The system of claim 1,
wherein, when extracting the traffic data from the one or more traffic servers, the one or more processors are to:
extract the traffic data based on an extensible markup language (XML) service request; and
wherein the one or more processors are further to:
receive, based on the XML service request, an XML formatted file including one or more XML entries,
an entry, of the one or more XML entries, including a location identifier to uniquely designate the retail store, a timestamp indicating a current time of day, information identifying a quantity of customers entering the retail store at the timestamp, and information identifying a quantity of customers exiting the retail store at the timestamp.

15. The system of claim 5,
wherein, when determining the one or more aggregated metrics, the one or more processors are to:
combine the aggregated region metrics with other metrics associated with an area to determine aggregated area metrics; and
wherein the one or more processors are further to:
store the aggregated area metrics in an aggregate area table,
the aggregate area table including the report date, the timestamp, and a location identifier of the area.

16. The system of claim 15,
wherein, when determining the one or more aggregated metrics, the one or more processors are to:
combine the aggregated area metrics with other metrics associated with a nation, to determine aggregated nation metrics; and
wherein the one or more processors are further to:
store the aggregated nation metrics in an aggregate nation table,
the aggregate nation table including the report date, the timestamp, and a location identifier of the nation.

17. The system of claim 1, wherein, when determining the one or more metrics for the retail store, the one or more processors are to:
- determine a total head count based on the resource management data; and
- determine a percentage of employees on duty by dividing information identifying a quantity of employees on duty by information identifying the total head count and multiplying by one-hundred.

18. The system of claim 1, wherein, when determining the one or more metrics for the retail store, the one or more processors are to:
- determine foot traffic per employee by dividing information identifying the foot traffic by information identifying a quantity of employees on duty;
- determine a quantity of full time employees based on the resource management data; and
- determine foot traffic per full-time employee by dividing information identifying the foot traffic by information identifying the quantity of full time employees.

19. The system of claim 1, wherein, when determining the one or more aggregated metrics, the one or more processors are to:
- sum information identifying a quantity of sales transactions in retail stores of a geographic area that includes the retail store.

20. The system of claim 1, wherein, when determining the one or more aggregated metrics, the one or more processors are to:
- sum, based on the traffic data, information identifying foot traffic of retail stores that include the retail store.

* * * * *